(12) United States Patent
Jayaram et al.

(10) Patent No.: US 8,074,778 B2
(45) Date of Patent: Dec. 13, 2011

(54) CLUTCH AND BRAKE LATCH MECHANISM

(75) Inventors: Mavinkal Jayaram, Broadview heights, OH (US); Philip George, Wooster, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 790 days.

(21) Appl. No.: 12/214,039

(22) Filed: Jun. 16, 2008

(65) Prior Publication Data
US 2008/0314711 A1 Dec. 25, 2008

Related U.S. Application Data

(60) Provisional application No. 60/936,348, filed on Jun. 20, 2007.

(51) Int. Cl.
*F15B 15/26* (2006.01)
*F16D 25/0638* (2006.01)

(52) U.S. Cl. .............. 192/85.24; 192/85.35; 192/114 R; 92/24

(58) Field of Classification Search .............. 192/85.26, 192/85.34, 85.35, 85.2; 92/22
See application file for complete search history.

(56) References Cited

U.S. PATENT DOCUMENTS

| 2,632,425 | A | * | 3/1953 | Grover | 92/28 |
| 3,324,771 | A | * | 6/1967 | Cruse | 92/24 |
| 4,729,462 | A | | 3/1988 | Kaneko | |
| 6,771,031 | B1 | | 8/2004 | Bai | |
| 2005/0258013 | A1 | * | 11/2005 | Stevenson et al. | 192/114 R |

* cited by examiner

*Primary Examiner* — Rodney Bonck
(74) *Attorney, Agent, or Firm* — Simpson & Simpson, PLLC

(57) ABSTRACT

A clutch including: a first piston displaceable to operate a clutch pack; a second piston; a first fluid chamber partially formed by the pistons, wherein the second piston is displaceable by fluid pressure in the first fluid chamber; and a locking means fixable by the second piston to hold the pack closed. In a preferred embodiment, the locking means includes at least one displaceable ball. In another preferred embodiment, in response to a loss of fluid pressure in the first chamber, the second piston is displaceable to enable displacement of the locking means to open the pack. In a further preferred embodiment, the clutch includes a second chamber, separate from the first chamber and partially formed by the first piston. The first piston is displaceable in response to fluid pressure in the second chamber. The pack remains closed after a loss or reduction of fluid pressure in the second chamber.

19 Claims, 20 Drawing Sheets

CLUTCH AND BRAKE LATCH MECHANISM

CROSS-REFERENCE TO RELATED APPLICATIONS

This application claims the benefit under 35 U.S.C. §119 (e) of U.S. Provisional Application No. 60/936,348 filed on Jun. 20, 2007 and is incorporated herein by reference.

FIELD OF THE INVENTION

The invention relates generally to clutches and brakes, and more specifically to a hydraulically applied brake assembly that remains engaged after most of the pressure is removed.

BACKGROUND OF THE INVENTION

Automatic transmissions employ the use of hydraulic pressure to engage and disengage clutches and brakes to change gear ratios. Generally, high pressure is maintained on the clutch piston so that the clutch or brake will transmit torque sufficient to propel the vehicle. However, a continuously operating transmission pump must produce high pressure to keep the clutch engaged. Continuous operation of this pump results in decreased fuel economy.

U.S. Pat. No. 4,729,462 employs external levers and actuators to actuate the clutch, resulting in additional cost and space requirements. U.S. Pat. No. 6,771,031 uses electric motors to actuate the clutch, adding the cost of the motor and energy use to maintain engagement.

Thus, there is a long-felt need for an inexpensive and space saving design to maintain torque transmission in a hydraulically applied clutch, while increasing fuel economy by operating a low pressure. There is also a need for a fail-safe device to release a transmission clutch when a minimum pressure cannot be maintained.

BRIEF SUMMARY OF THE INVENTION

The present invention broadly comprises a clutch including: a first piston displaceable to operate a clutch pack; a second piston; a first fluid chamber at least partially formed by the first and second pistons, wherein the second piston is displaceable by fluid pressure in the first fluid chamber; and a locking means fixable by the second piston to hold the clutch pack in a closed position. In a preferred embodiment, the locking means includes at least one radially displaceable ball. In another preferred embodiment, in response to a loss of fluid pressure in the first chamber, the second piston is displaceable to enable displacement of the locking means to open the clutch pack.

In one embodiment, the clutch includes a cam follower and a cam ring engaged with the cam follower. By pressurizing the first fluid chamber: the first piston is displaceable to engage the cam follower to close the clutch pack; the locking means is axially aligned with the cam ring to axially fix the cam follower; and the second piston is engaged with the locking means to radially fix the locking means.

In one embodiment, the clutch includes a second fluid chamber partially formed by the first piston and separate from the first fluid chamber; a third fluid chamber separate from the first and second fluid chambers and partially formed by the second piston; and a control valve operable by displacement of the second piston to control fluid pressure in the third fluid chamber. Displacement of the second piston is controllable by respective fluid pressures in the first, second, and third fluid chambers, the second piston is displaceable to fix the locking means when fluid pressure in the first chamber is sufficiently greater than fluid pressure in the third chamber, and the locking means is displaceable to enable axial displacement of the first piston when the respective fluid pressures in the first and third chambers are substantially equal. In another embodiment, In another embodiment, the clutch includes a second fluid chamber partially formed by the first piston and separate from the first fluid chamber; a third fluid chamber separate from the first and second fluid chambers and partially formed by the second piston; and a control valve operable by displacement of the second piston to control fluid communication between the first and third fluid chambers. Displacement of the second piston is controllable by respective fluid pressures in the first, second, and third fluid chambers, the second piston is displaceable to fix the locking means when the first and third fluid chambers are in fluid isolation, and the locking means is displaceable to enable axial displacement of the first piston when the first and second chambers are in fluid communication.

In a further embodiment, the clutch includes a wear compensation spring engaged with the first piston and the clutch pack. In a further preferred embodiment, the clutch includes a second chamber, separate from the first chamber and partially formed by the first piston. The first piston is displaceable in response to fluid pressure in the second chamber. The clutch pack remains closed after a loss or reduction of fluid pressure in the second chamber.

The present invention also includes a method of operating a clutch

It is a general object of the present invention to provide a hydraulically applied brake assembly that remains engaged after most of the pressure is removed.

This and other objects and advantages of the present invention will be readily appreciable from the following description of preferred embodiments of the invention and from the accompanying drawings and Claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural element of the invention. While the present invention is described with respect to what is presently considered to be the preferred aspects, it is to be understood that the invention as Claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended Claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
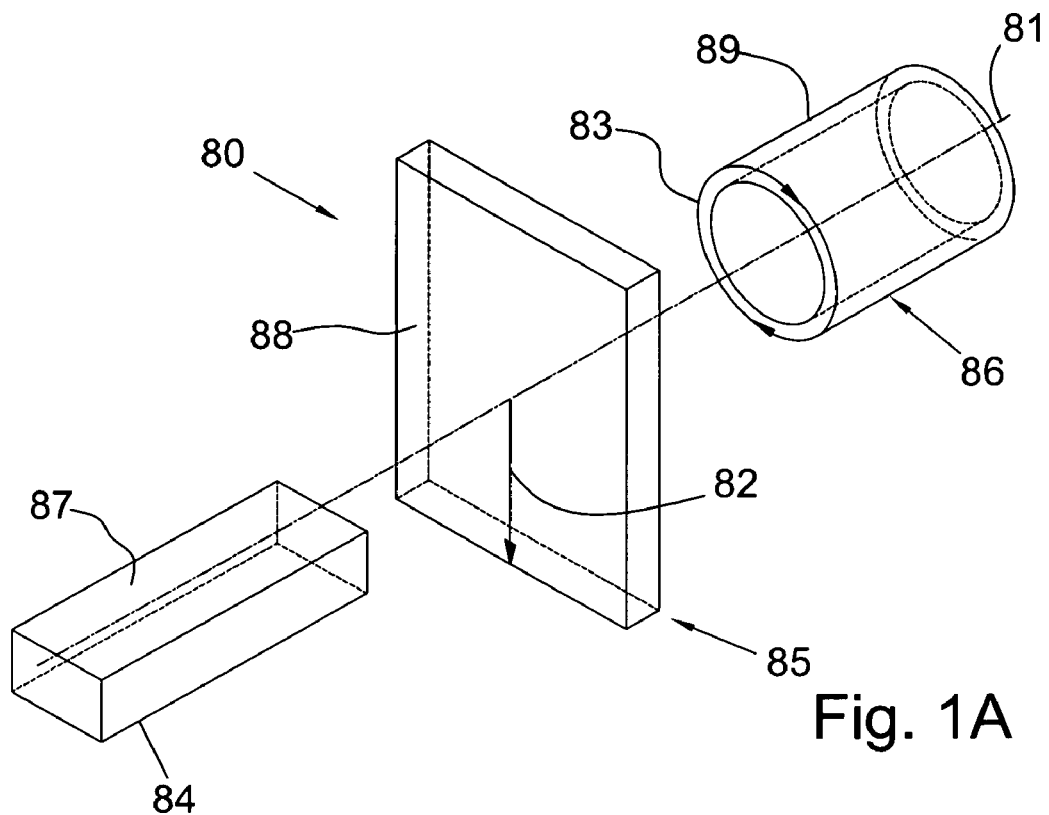
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
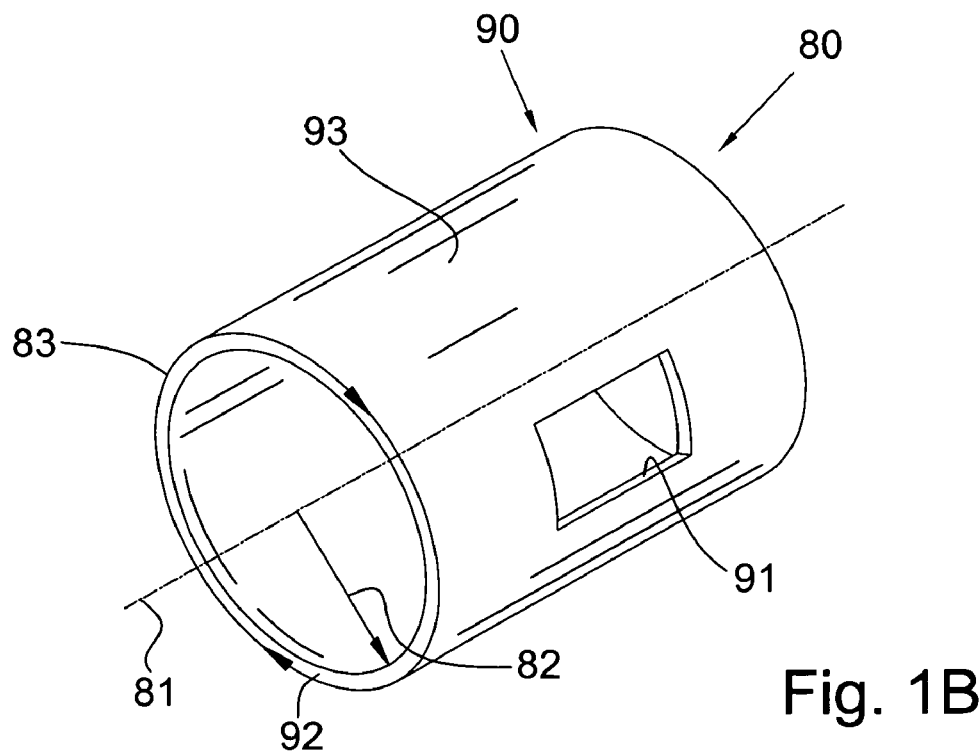
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
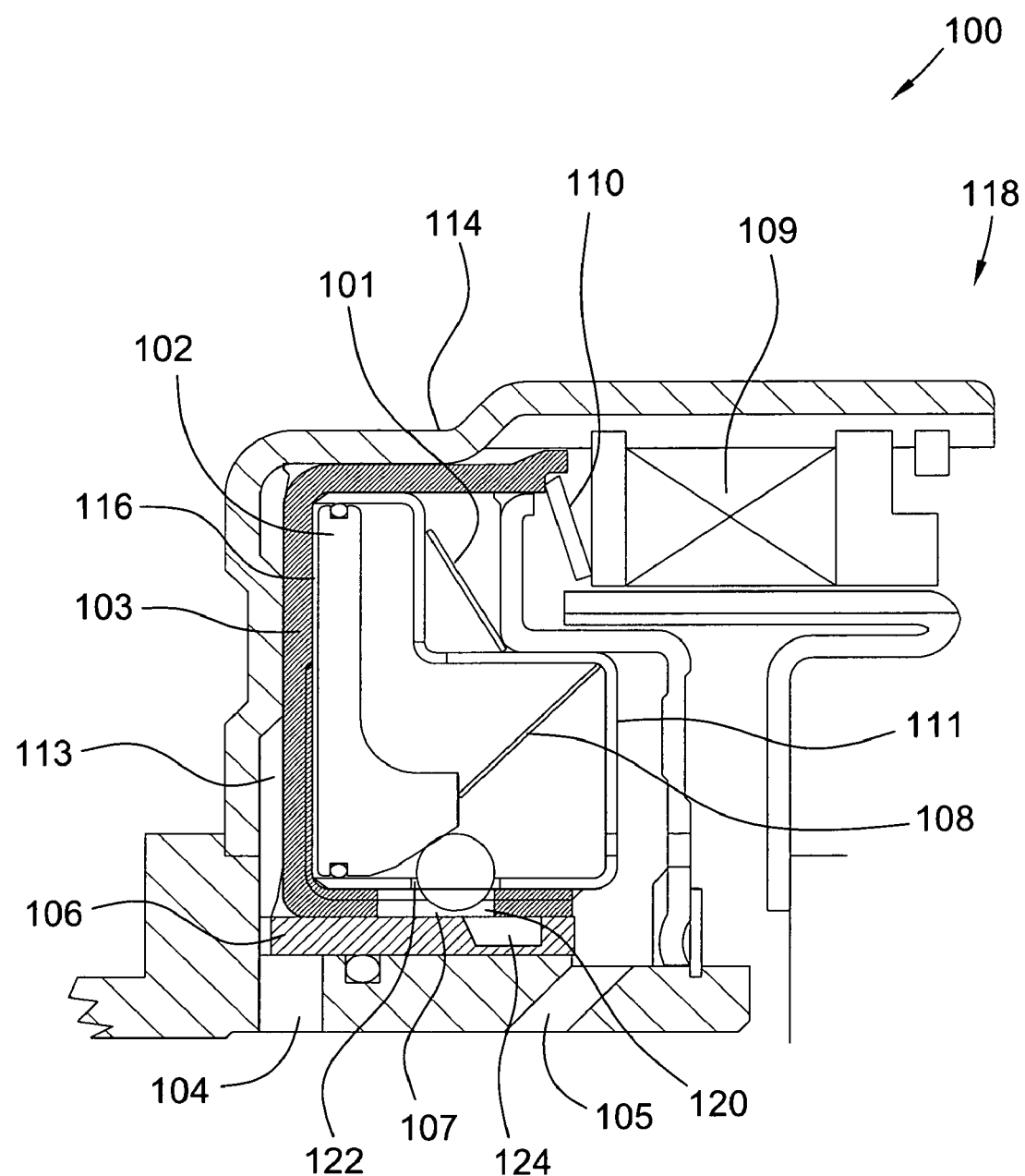
FIG. 2 is a cross sectional view of a present invention transmission clutch in a default open state and in a fail-safe open condition.

FIG. 2 is a cross sectional view of present invention transmission clutch 100 in a default open state and in fail-safe open condition.

Figure 3:
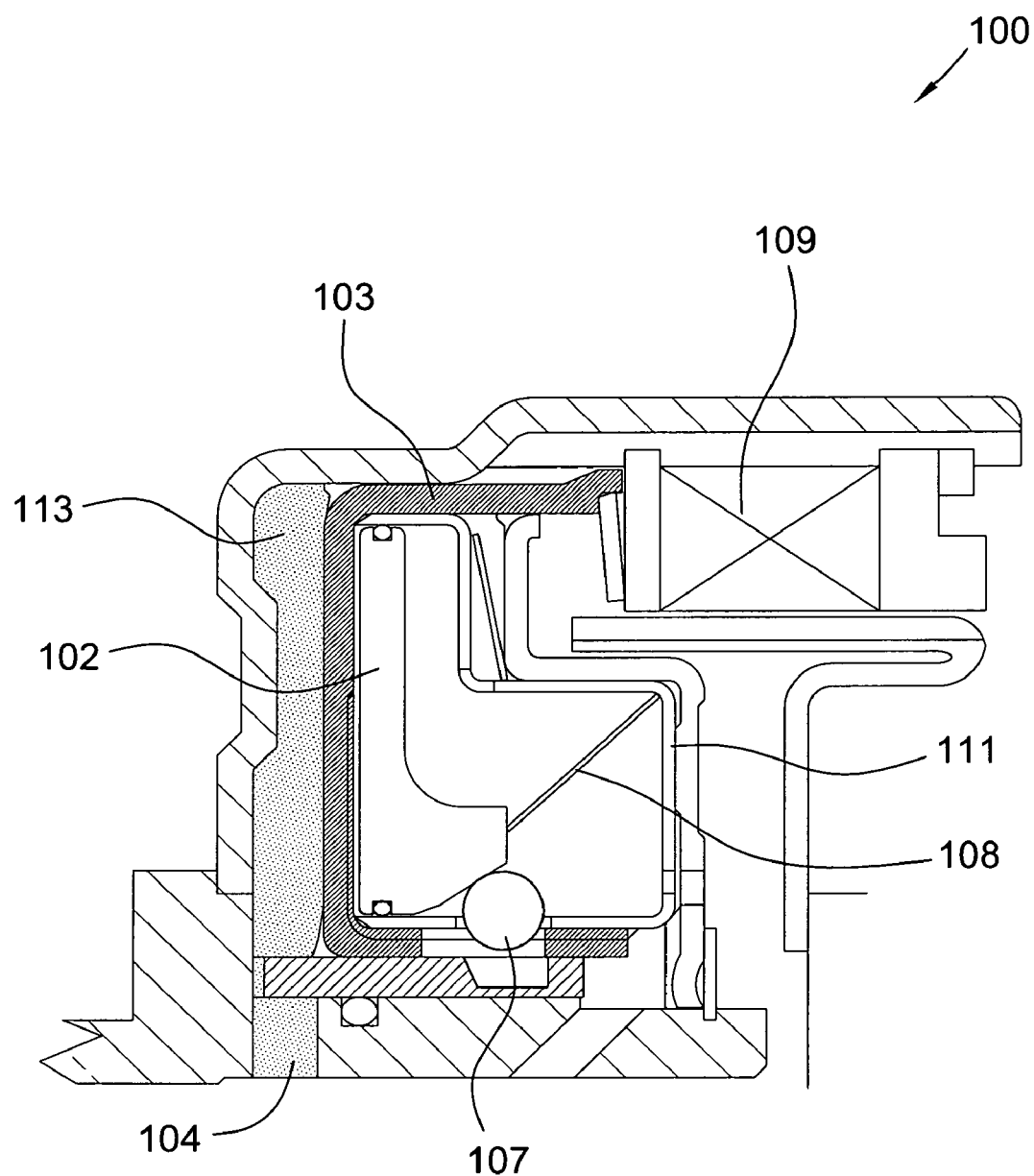
FIG. 3 is a cross-sectional view of the transmission clutch shown in FIG. 2 in a high pressure closed condition.

FIG. 3 is a cross-sectional view of transmission clutch 100 in a high pressure closed condition.

Figure 4:
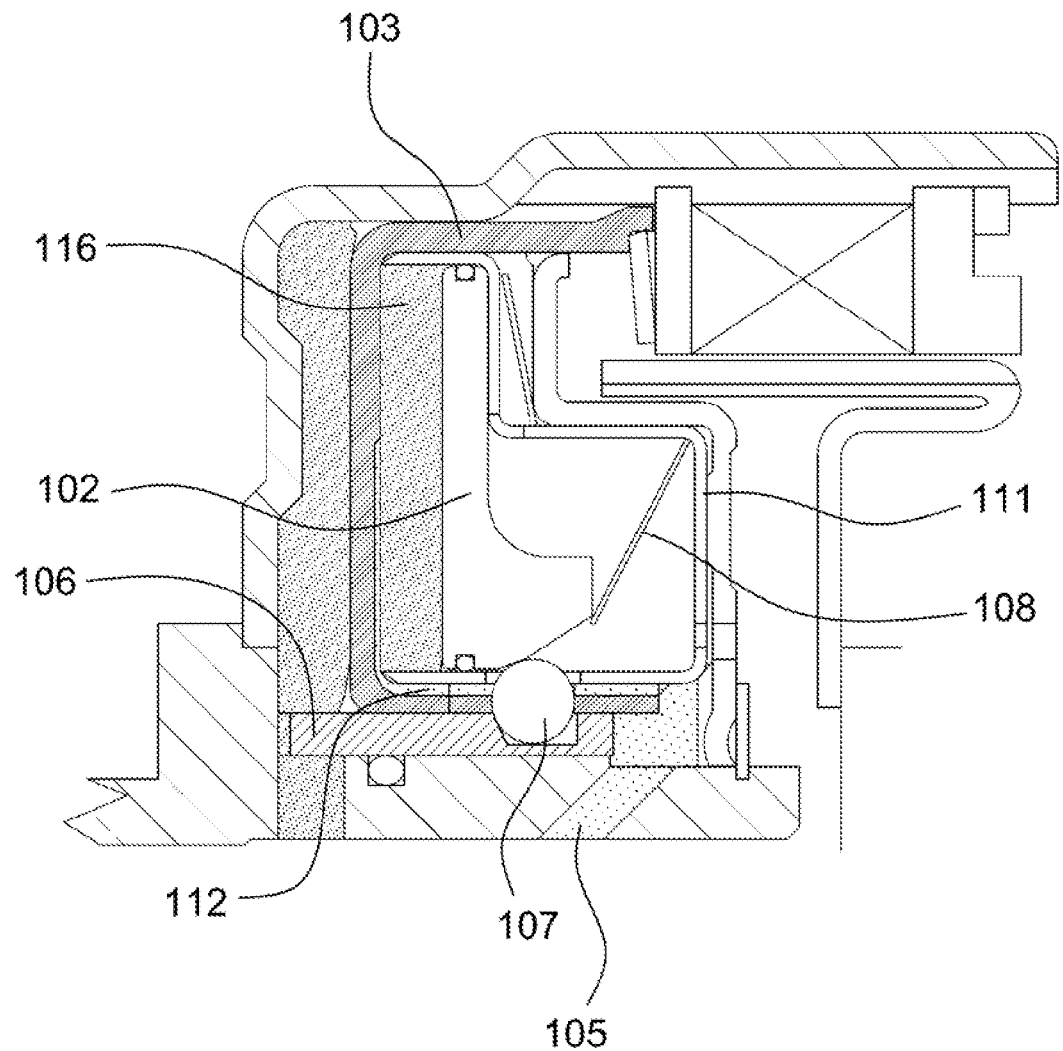
FIG. 4 is a cross sectional view of the transmission clutch shown in FIG. 2 in a high pressure closed condition with a lock mechanism engaged.

FIG. 4 is a cross sectional view of transmission clutch 100 in a high pressure closed condition with a lock mechanism engaged.

Figure 5:
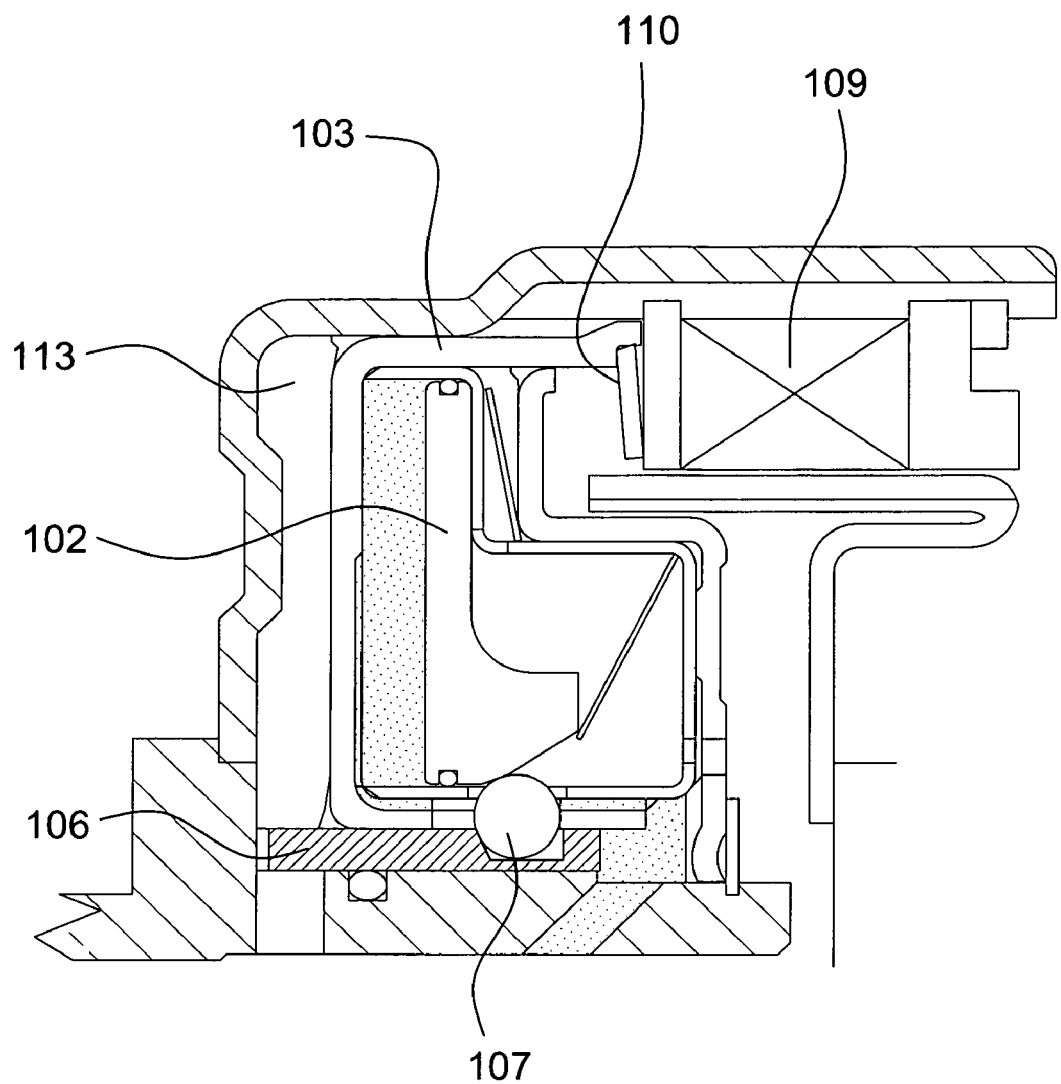
FIG. 5 is a cross-sectional view of the transmission clutch shown in FIG. 2 in a low pressure closed condition.

FIG. 5 is a cross-sectional view of transmission clutch 100 in a low pressure closed condition. The following should be viewed in light of FIGS. 2 through 5. Transmission clutch 100 includes pistons 102 and 103. Piston 103 is displaceable, for example, by controlling pressure in fluid chamber 113, to operate, for example, close or open, clutch pack 109. Chamber 113 is partially formed by piston 103 and case 114. Fluid chamber 116 is partially formed by pistons 102 and 103. Piston 102 is displaceable by fluid pressure in chamber 116. Locking means 107 is fixable by, or using, piston 102, as further described infra, to hold the clutch pack in a closed position. In a preferred embodiment, means 107 is at least one ball. The ball is axially and radially displaceable. As further described infra, if the fluid pressure in chamber 116 is lost, whether intentionally or due to malfunction, piston 102 is displaceable to release the locking means and to enable the clutch to open.

Clutch pack 109 transmits torque in transmission 118. The clutch pack can be any clutch pack known in the art. Clutch pack 109 receives clamping load from wear compensation spring 110. Wear compensation spring 110 is employed to maintain axial position of the transmission clutch components as friction material (not shown) in clutch pack 109 wears during the life of the vehicle.

Spring 110 reacts against primary piston 103, which provides clamping force when clutch apply is desired. Pressurized fluid is applied to piston 103 through pressure port 104. Holding pressure is applied to nested piston 102 through chamber 116 and pressure port 105. Outer diameter of piston 103 is sealed to the housing, and inner diameter of piston 103 is sealed to reaction ring 106. Inner diameter of reaction ring 106 is sealed to the housing.

Nested piston 102 is sealed at its outer and inner diameters to nested cylinder 111. Nested cylinder 111 is urged towards piston 103 by return spring 101. Cylinder 111 is fixed to primary piston 103. Nested piston 102 is urged towards piston 103 by return spring 108. Ball 107 is received in through holes 120, 122, and 124, in piston 103, cylinder 111, and reaction ring 106, respectively.

The operation of the clutch assembly will now be described. To engage clutch 109, oil at high pressure, for example, at 10 bar, is introduced into chamber 113 through pressure port 104 as shown in FIG. 3. This pressure urges primary piston 103 to move to the right (all directions in the discussions that follow are with respect to the Figures) engaging the clutch pack 109, as shown in FIG. 3. This action also pushes the corner of nested cylinder 111 against an oil seal as shown in FIG. 3. Primary piston 103 carries nested piston 102, ball/roller lock 107, nested cylinder 111, and nested piston return spring 108 to the engaged position as shown in FIG. 4. An externally controlled hydraulic valve (not shown) is activated to supply low pressure oil, for example, 2 bar, to port 105 as shown in FIG. 4. The high pressure oil is held at a constant level during this operation. The low pressure oil urges nested piston 102 to the right as shown in FIG. 4. The motion of nested piston 102 compresses nested piston return spring 108 and pushes ball/roller lock 107 into the pocket formed by holes in piston 103, cylinder 111, and reaction ring 106. That is, piston 102 fixes, or holds in place, the ball lock. Oil passage 112 cut on the surface of primary piston 103 allows oil to enter chamber 116.

The high pressure oil to chamber 113 is cut off while the low pressure oil supply remains active as shown in FIG. 5. Spring 110 urges piston 103 to the left, but ball/roller lock 107 is forced in the pocket in reaction ring 106 and piston 103 by the angled surface of nested piston 102, preventing displacement of piston 103. This maintains clutch capacity even when high pressure is removed. That is, the ball locks, or fixes, piston 103 with respect to the reaction ring, which is fixed with respect to the case.

Contact angles between the ball/roller lock 107 and nested piston 102, and ball/roller lock 107 and reaction ring 106 are designed such that the force generated by nested piston 102 is required continuously to hold the ball/roller lock 107 in position. The force on piston 103 from spring 110 is reacted against reaction ring 106 through ball/roller lock 107. That is, without the force on the piston, the ball lock tends to displace out of locking engagement with piston 103.

To disengage clutch pack 109, the high pressure oil supply is reintroduced through 10 bar pressure port 104 and the low pressure oil supply is removed. Return spring 108 urges nested piston 102 to the left, freeing ball/roller lock 107. The high pressure oil supply is lowered to disengage clutch pack 109.

Advantageously, clutch 109 is automatically disengaged if oil pressure in pressure port 105 is lost. This fail safe operation is shown in FIG. 2. For example, in the absence of fluid pressure in chamber 116, piston 102 is not forced against ball lock 107. Specifically, nested piston 102 is pushed to the left by nested piston return spring 108 freeing ball/roller lock 107. Piston 103 is immediately freed and released by springs 101 and 110.

Advantageously, the design shown in FIGS. 2 through 5 does not need any system reset procedure after the oil pressure is brought back to normal since a loss of oil pressure shifts the components into the default condition as shown in FIG. 2.

Figure 6:
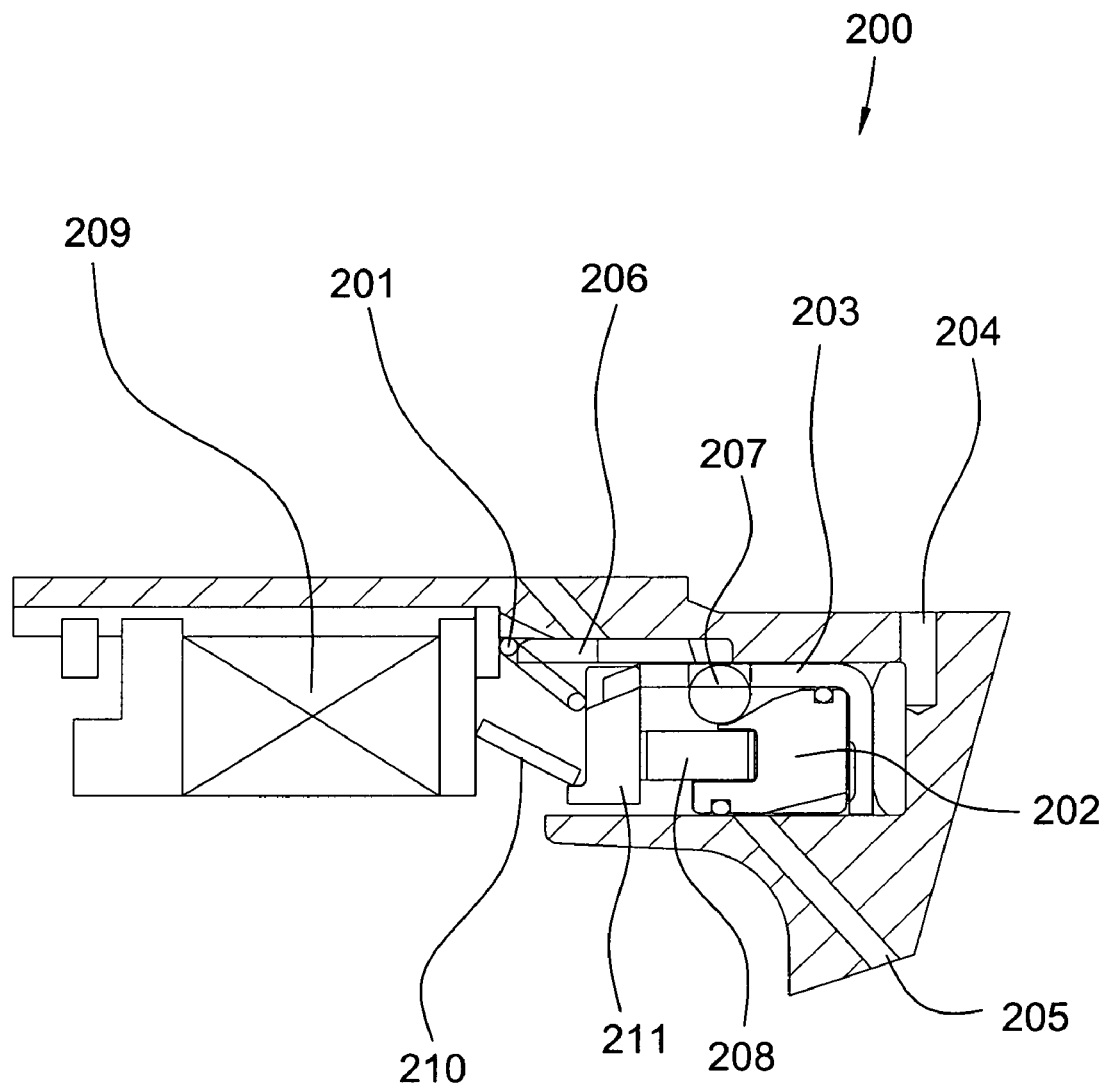
FIG. 6 is a cross sectional view of a present invention transmission brake.

FIG. 6 is a cross sectional view of transmission brake 200. The design of clutch 100 may also be used in a transmission brake, as shown in FIG. 6. In general, brake 200 has the same components as clutch 100 and the discussion regarding clutch 100 is applicable to brake 200. Components "1xx" in FIGS. 2-5 are referenced as "2xx" in FIG. 6 and have similar functions in both figures. For example, cylinder 202 in FIG. 6 has a similar function to cylinder 102 in FIG. 2. However, clutch pack 209 is grounded to case 214.

Figure 7:
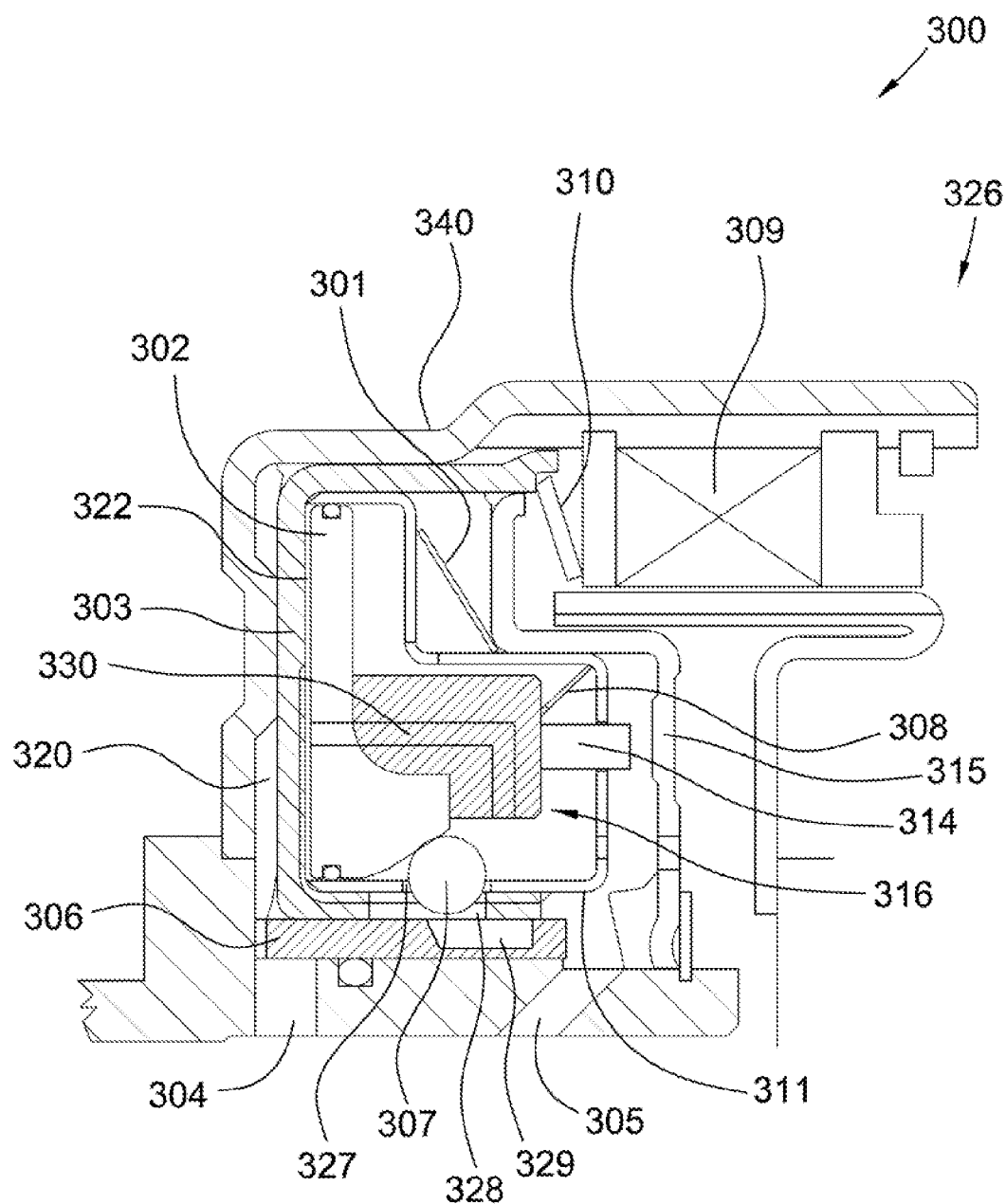
FIG. 7 is a cross sectional view of a present invention transmission clutch in a default open state and in a fail-safe open condition.

FIG. 7 is a cross sectional view of present invention transmission clutch 300 in a default open state.

Figure 8:
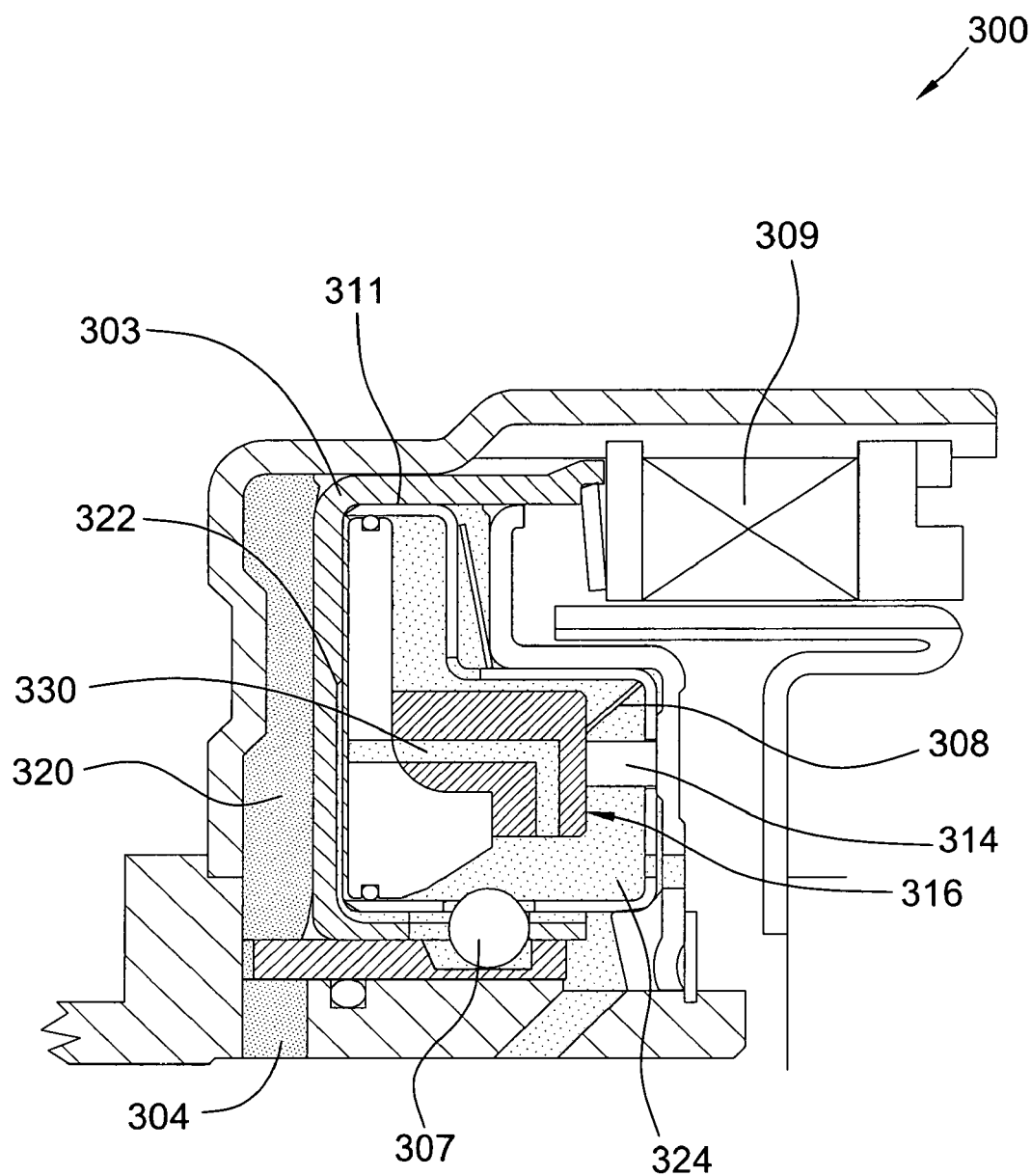
FIG. 8 is a cross-sectional view of the transmission clutch shown in FIG. 7 in a high pressure closed condition.

FIG. 8 is a cross-sectional view of transmission clutch 300 in a high pressure closed condition.

Figure 9:
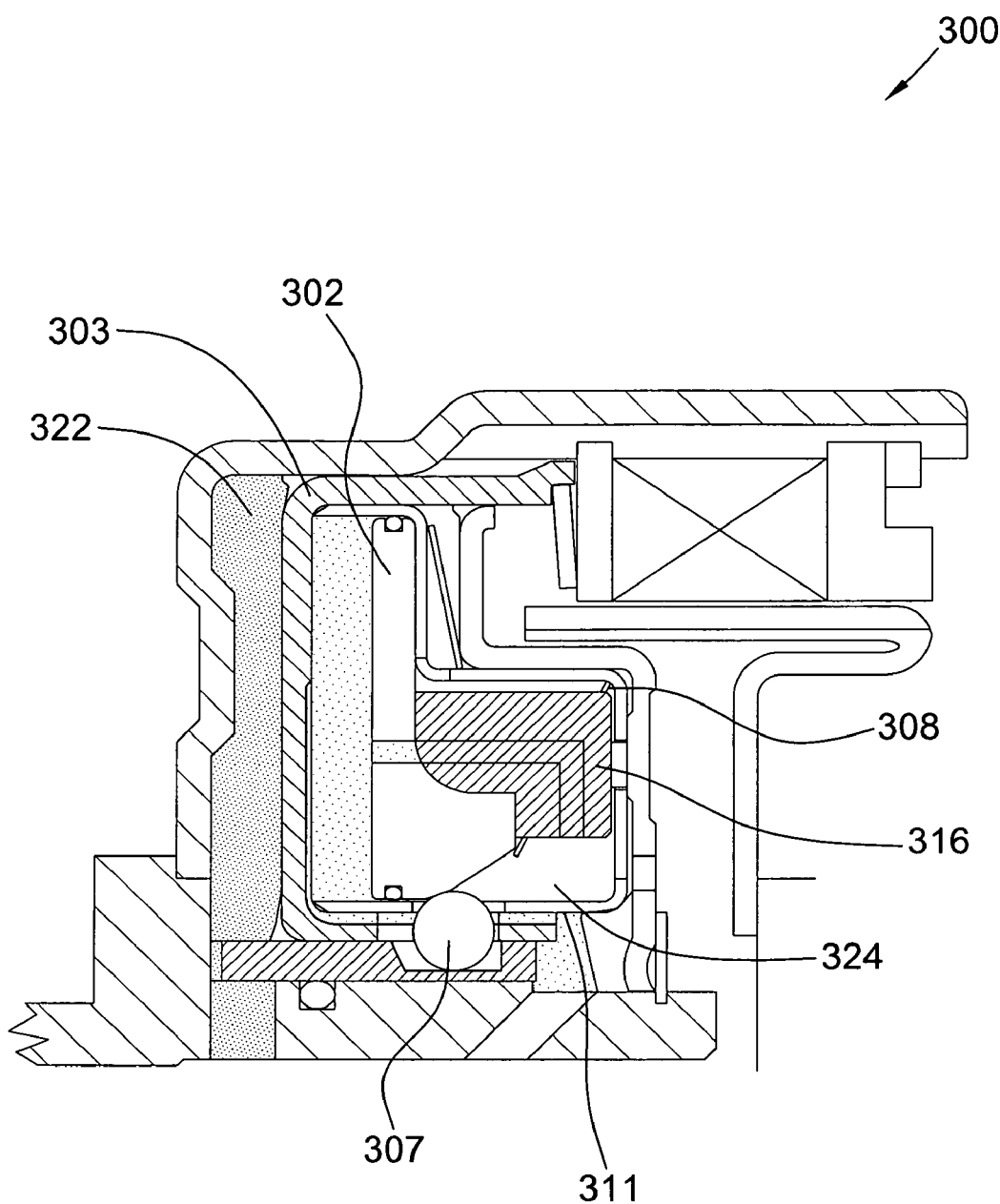
FIG. 9 is a cross sectional view of the transmission clutch shown in FIG. 7 in a high pressure closed condition with a lock mechanism engaged.

FIG. 9 is a cross sectional view of transmission clutch 300 in a high pressure closed condition with a lock mechanism engaged.

Figure 10:
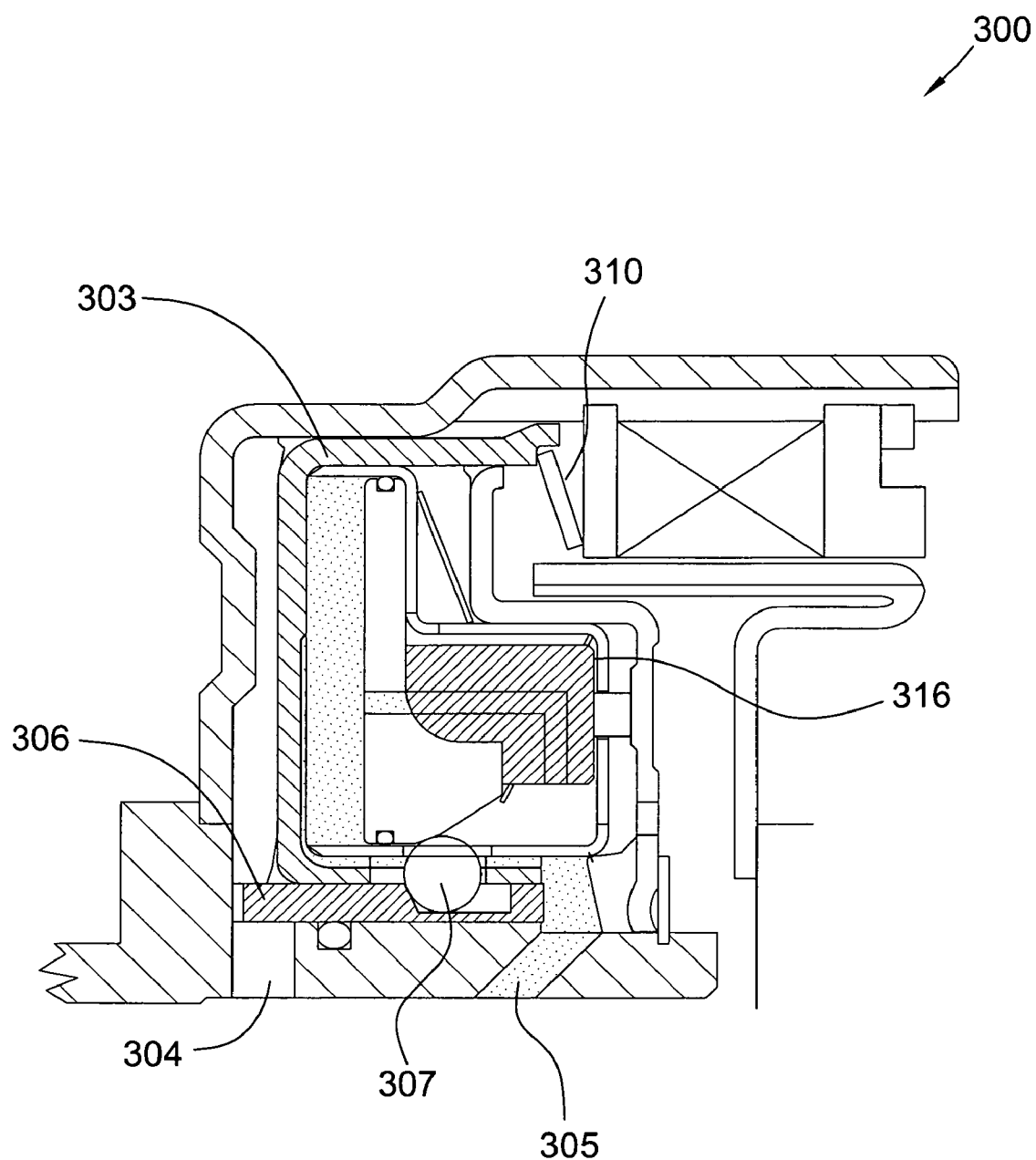
FIG. 10 is a cross-sectional view of a second embodiment of the transmission clutch shown in FIG. 7 in a low pressure closed condition.

FIG. 10 is a cross-sectional view of transmission clutch 300 in a low pressure closed condition.

Figure 11:
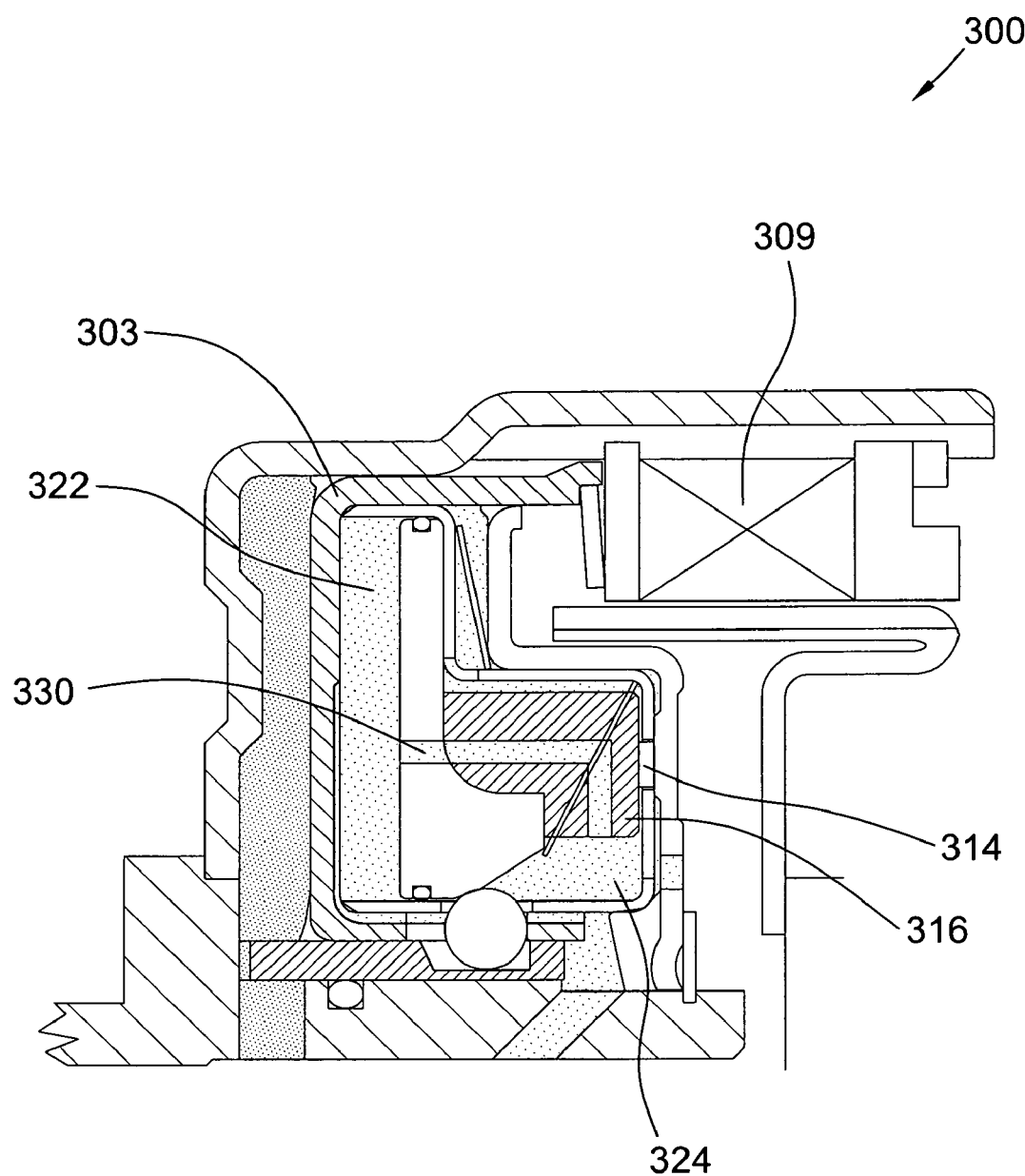
FIG. 11 is a cross sectional view of a second embodiment of the transmission clutch shown in FIG. 7 in a high pressure closed condition at the start of a release cycle.

FIG. 11 is a cross sectional view of transmission clutch 300 in a high pressure closed condition at the start of a release cycle. The following should be viewed in light of FIGS. 7 through 11. Transmission clutch 300 includes pistons 302 and 303. Piston 303 is displaceable, for example, by controlling pressure in fluid chamber 320, to operate clutch pack 309. Chamber 320 is partially formed by piston 303 and case 340. Fluid chamber 322 is partially formed by pistons 302 and 303. Chamber 324 is at least partially formed by piston 302 and nested cylinder 311. Piston 302 is displaceable by fluid pressure in chambers 322 and 324. Locking means 307 is fixable by piston 302, as further described infra, to hold the clutch pack in a closed position. In a preferred embodiment, means 307 is at least one ball. The ball is axially and radially displaceable. As further described infra, if the fluid pressure in chamber 322 is lost, whether intentionally or due to malfunction, piston 302 is displaceable to release the locking means and to enable the clutch to open.

Clutch pack 309 transmits torque in transmission 326. The clutch pack can be any clutch pack known in the art. Clutch pack 309 receives clamping load from wear compensation spring 310. Wear compensation spring 310 is employed to maintain axial position of the transmission clutch components as friction material (not shown) in clutch pack 309 wears during the life of the vehicle.

Spring 310 reacts against primary piston 303, which provides clamping force when clutch apply is desired. Pressurized fluid is applied to piston 303 through pressure port 304. Pressure is applied to nested piston 302 through pressure port 305. Outer diameter of piston 303 is sealed to the housing, and inner diameter of piston 303 is sealed to reaction ring 306. Inner diameter of reaction ring 306 is sealed to the housing.

Nested piston 302 is sealed at its outer and inner diameters to nested cylinder 311. Nested cylinder 311 is urged towards piston 303 by return spring 301. Cylinder 311 is fixed to primary piston 303. Nested piston 302 is urged towards piston 303 by return spring 308. Ball 307 is received in through holes 328, 327, and 329, in piston 303, cylinder 311, and reaction ring 306, respectively.

Clutch 300 also includes hydraulic valve 316 with valve spool 314. Valve 316 controls fluid communication between chambers 322 and 324 via channel 330 as further described infra. By incorporating hydraulic valve 316 into nested cylinder 311, an externally controlled hydraulic valve is not required. Low pressure oil supply is fed into the assembly 300 through port 305. Hydraulic valve 316 is activated by the movement of primary piston 303 and nested piston 302. Thus, the arrangement of pistons and locking means shown in FIG. 7 is similar to the arrangement shown in FIG. 2. The primary differences are fluid chamber 324 and valve 316. Respective fluid pressures in chambers 322 and 324 are used to control the displacement of piston 302 and hence, the position of ball lock 307. As described infra, valve 316 is used to control fluid communication between chambers 322 and 324. Specifically, the displacement of piston 302 controls the position of spool 314 with respect to sealing disc 315. The movement of the spool controls the operating states of the valve.

Before engaging clutch pack 309, assembly 300 is first placed in a reset state as shown in FIG. 7. In this state, primary piston 303 and nested piston 302 are in their default position and hydraulic valve 316 is in an open state, allowing oil to flow through valve 316.

The operation of the clutch assembly will now be described. In the default state, valve 316 is open and channel 330 is therefore open. Lower pressure fluid is introduced to chamber 322, and through the valve, to chamber 324. The lower pressure fluid is maintained at port 305 throughout the operation described below. Substantially equal pressures in chambers 322 and 324 keep piston 302 from engaging the ball lock. To engage clutch 309, oil at high pressure, for example, 10 bar, is introduced into chamber 320 through pressure port 304 as shown in FIG. 8. This pressure urges primary piston 303 to move to the right engaging clutch pack 309. Also, spool 314 is pressed into the valve, closing the valve. In FIG. 9, pressure in chamber 324 is removed while pressure in the remaining chambers is maintained. Valve 316 prevents fluid from entering chamber 324 from chamber 322. Primary piston 303 carries nested piston 302, ball/roller lock 307, nested cylinder 311, nested piston return spring 308, and inbuilt valve 316 to the engaged position. That is, piston 302 fixes the ball lock. This action also pushes the corner of nested cylinder 311 against an oil seal.

In FIG. 10, the high pressure oil through port 304 is cut off while the low pressure oil supply is continues through pressure port 305. Spring 310 urges piston 303 to the left, but ball/roller lock 307 is forced in the pocket in reaction ring 306 and piston 303 by the angled surface of nested piston 302, preventing displacement of piston 303. This maintains clutch capacity even when high pressure is removed. That is, the ball locks, or fixes, piston 303 with respect to the reaction ring, which is fixed with respect to the case.

The contact angles between the ball/roller lock 307 and nested piston 302, and ball/roller lock 307 and reaction ring 306 are designed such that the force generated by nested piston 302 is required continuously to hold the ball/roller lock 307 in position. The force on piston 303 from spring 310 is reacted against reaction ring 306 through ball/roller lock 307. Valve 316 remains in a closed state.

To disengage clutch pack 309, the high pressure oil supply through port 304 is reintroduced, thereby urging piston 303 to the right as shown in FIG. 11. Compression of spool 314 causes a state change from closed to open, enabling transfer of fluid from chamber 322 to chamber 324. Return spring 308 urges nested piston 302 to the left, freeing ball/roller lock 307. The high pressure oil supply through port 304 is lowered to disengage clutch pack 309.

Advantageously, clutch 309 is automatically disengaged if oil pressure in pressure port 305 is lost. This fail safe operation is shown in FIG. 7. Nested piston 302 is pushed to the left by nested piston return spring 308 freeing ball/roller lock 307. Primary piston 303 is immediately freed and released by spring 301. A reset sequence is used to determine the current state of the valve 316 to resume normal operation.

Thus, when valve 316 is closed, blocking channel 330, pressure in chamber 322 is greater than pressure in chamber 324 and piston 302 is displaceable to fix ball lock 307. For example, chamber 322 is pressurized and chamber 324 is vented. Alternately stated, when chambers 322 and 324 are in fluid isolation via a blocking of channel 330, piston 302 is displaceable to fix ball lock 307. Further, when valve 316 is open, opening channel 330, pressure in chamber 322 is substantially the same as pressure in chamber 324 and piston 302 is displaceable to enable axial displacement of piston 303. That is, piston 302 is displaceable to enable ball lock 307 to displace out of the locked/engaged position. Alternately stated, when chambers 322 and 324 are in fluid communication via channel 330, piston 302 is displaceable to enable axial displacement of piston 303.

Figure 12:
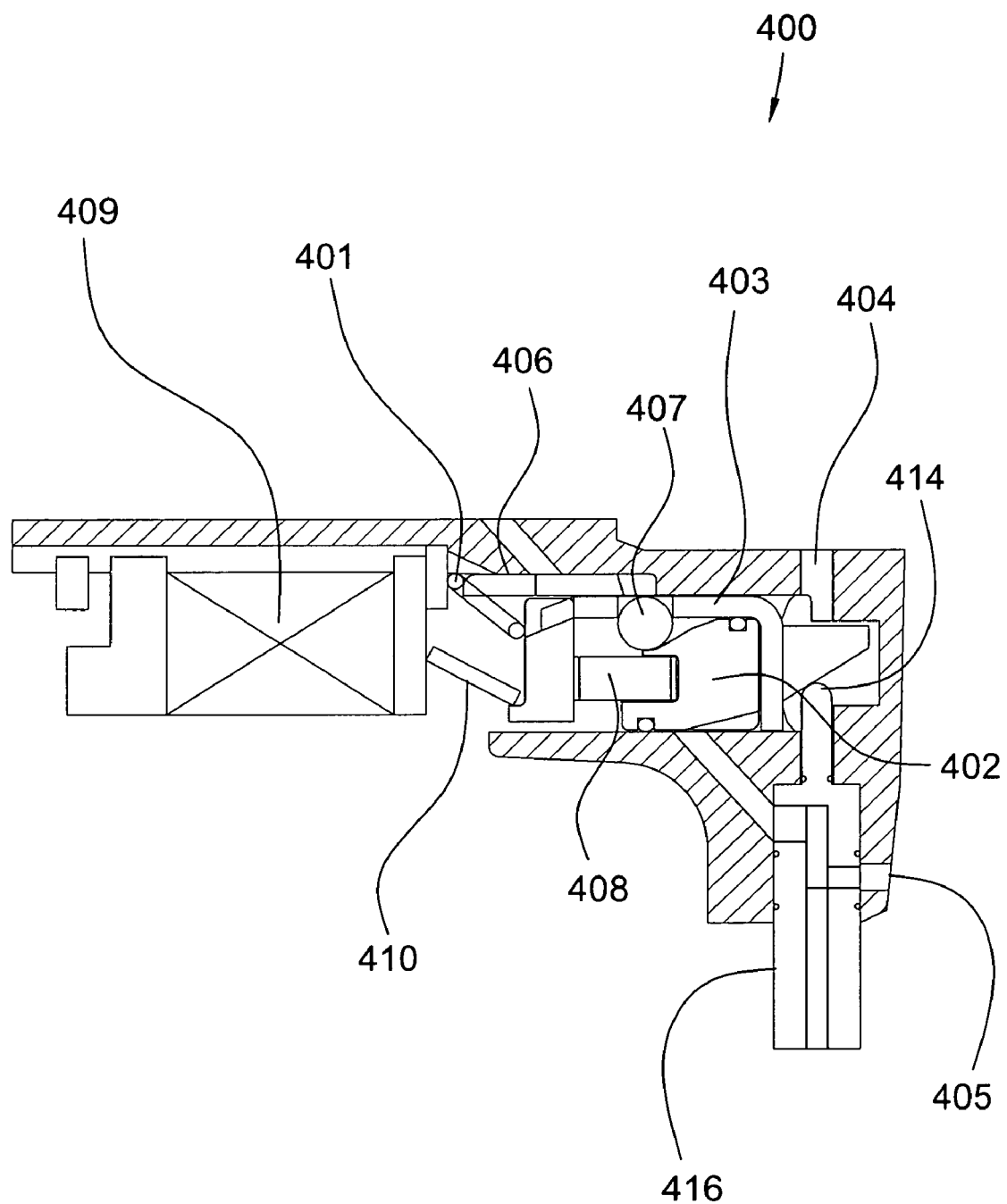
FIG. 12 is a cross sectional view of a present invention transmission brake.

FIG. 12 is a cross sectional view of transmission brake 400. The design of clutch 300 may also be used in a transmission brake, as shown in FIG. 12. In general, brake 400 has the same components as clutch 300 and the discussion regarding clutch 300 is applicable to brake 400. Components "3xx" in FIGS. 7-11 are referenced as "4xx" in FIG. 12 and have similar functions in both figures. For example, cylinder 402 in FIG. 12 has a similar function to cylinder 302 in FIG. 7. However, clutch pack 409 is grounded to case 440.

Figure 13:
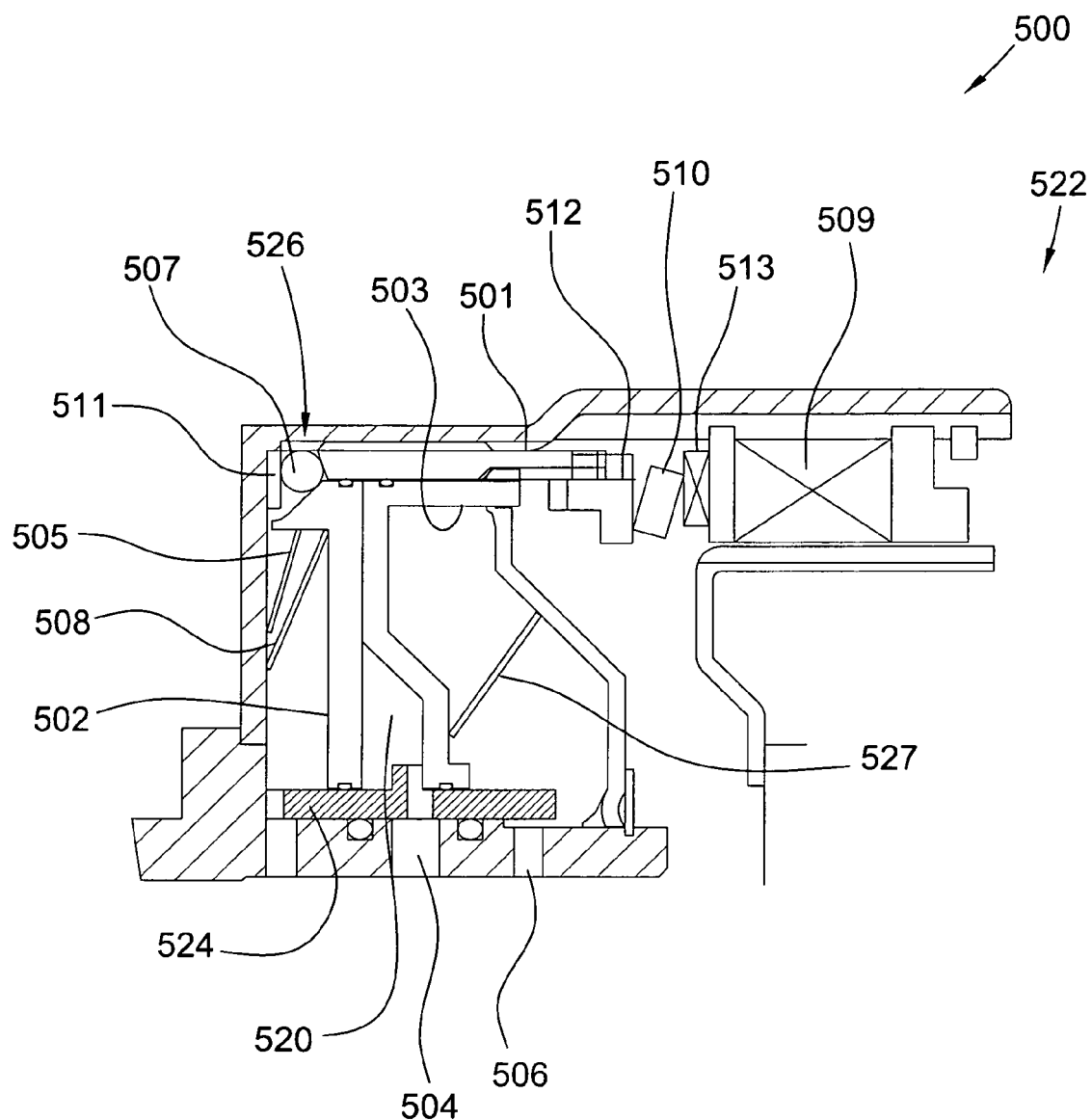
FIG. 13 is a cross sectional view of a present invention transmission clutch in a default open state and in a fail-safe open condition.

FIG. 13 is a cross sectional view of present invention transmission clutch 500 in a default open state.

Figure 14:
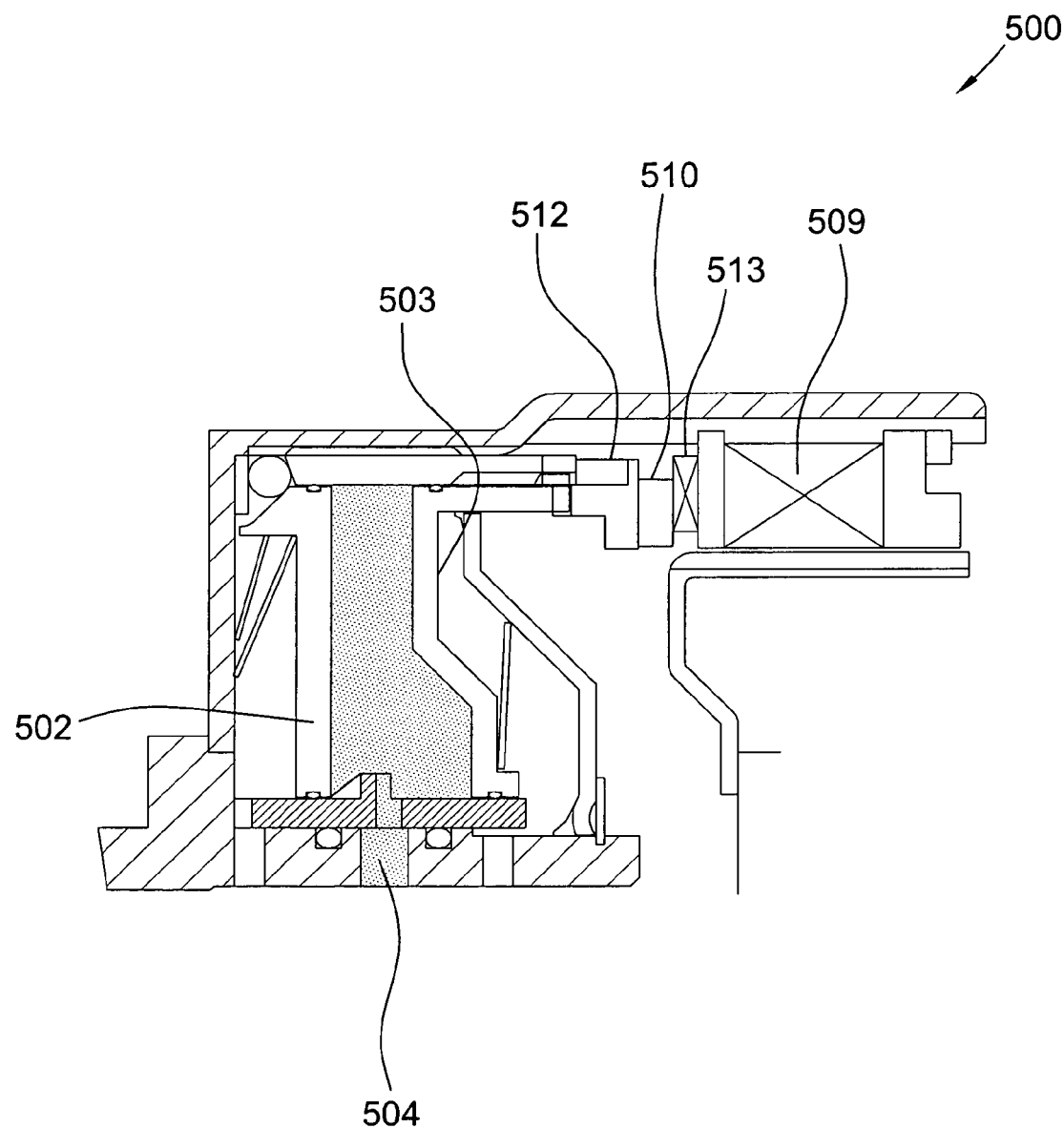
FIG. 14 is a cross-sectional view of the transmission clutch shown in FIG. 16 in a high pressure closed condition.

FIG. 14 is a cross-sectional view of transmission clutch 500 in a high pressure closed condition.

Figure 15:
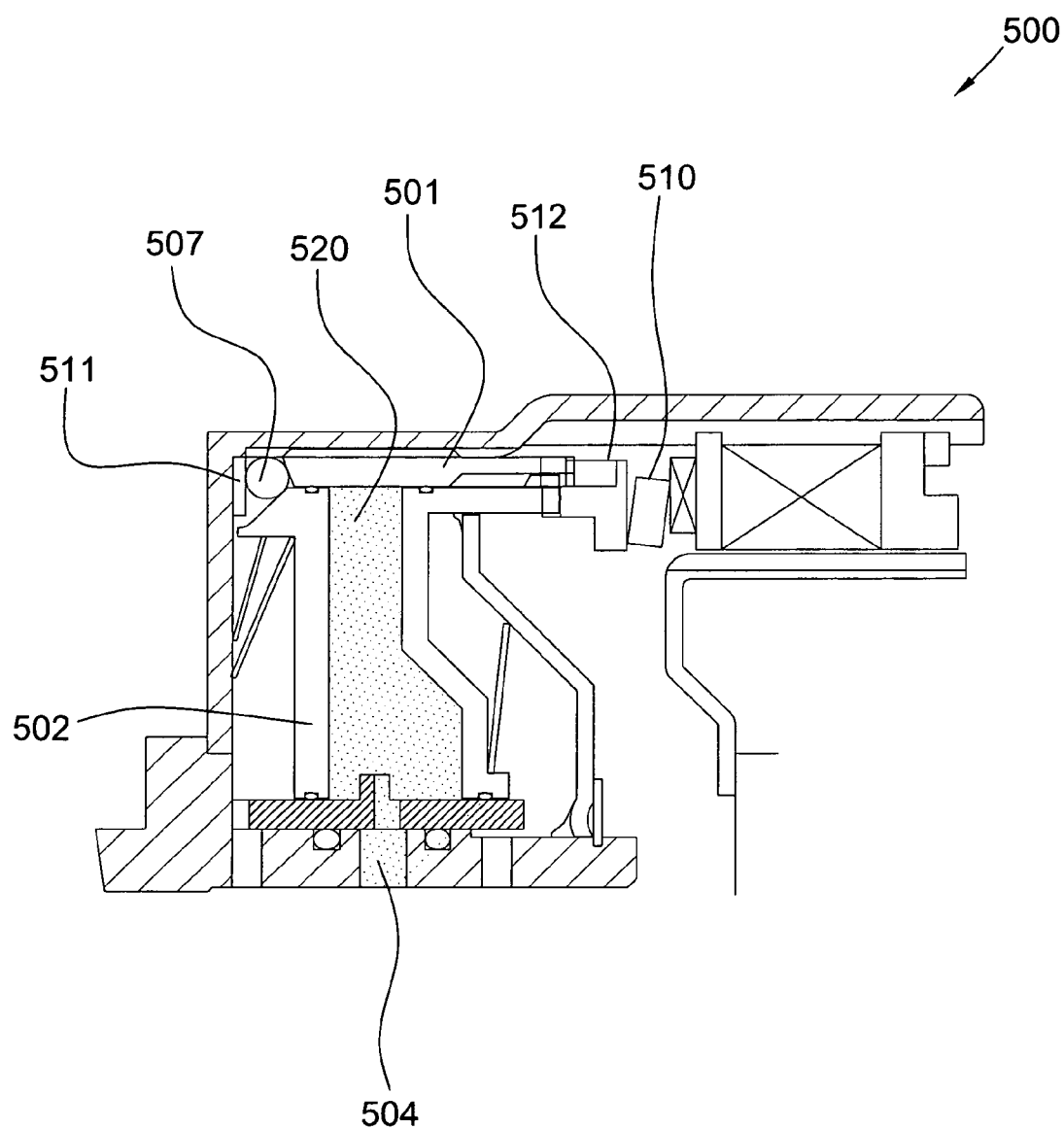
FIG. 15 is a cross sectional view of the transmission clutch shown in FIG. 16 in a low pressure closed condition with a lock mechanism engaged.

FIG. 15 is a cross sectional view of transmission clutch 500 in a low pressure closed condition with a lock mechanism engaged.

Figure 16:
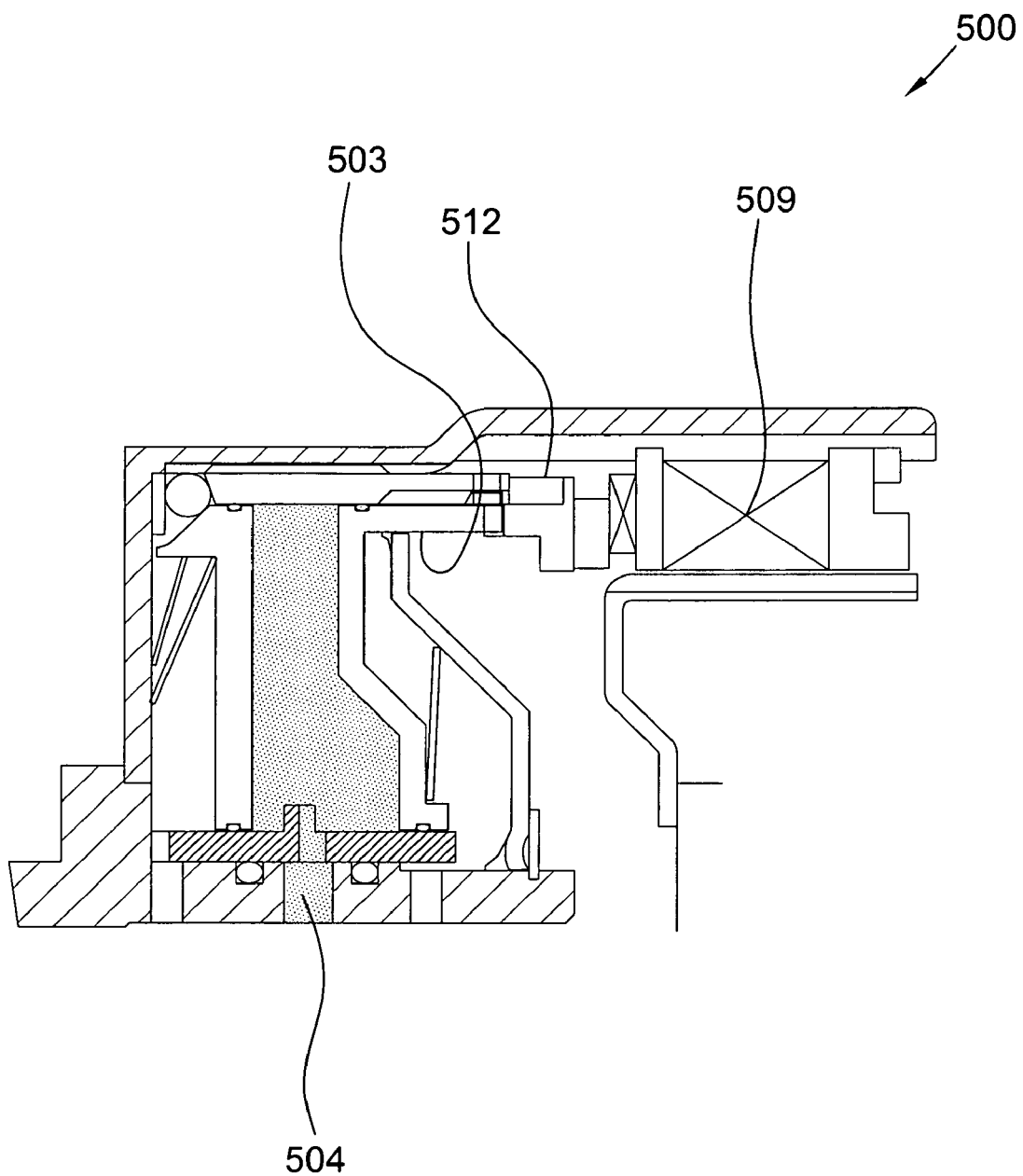
FIG. 16 is a cross-sectional view of the transmission clutch shown in FIG. 16 in a high pressure closed condition at the start of a release cycle.

FIG. 16 is a cross-sectional view of transmission clutch 500 in a high pressure closed condition at the start of a release cycle.

Figure 17:
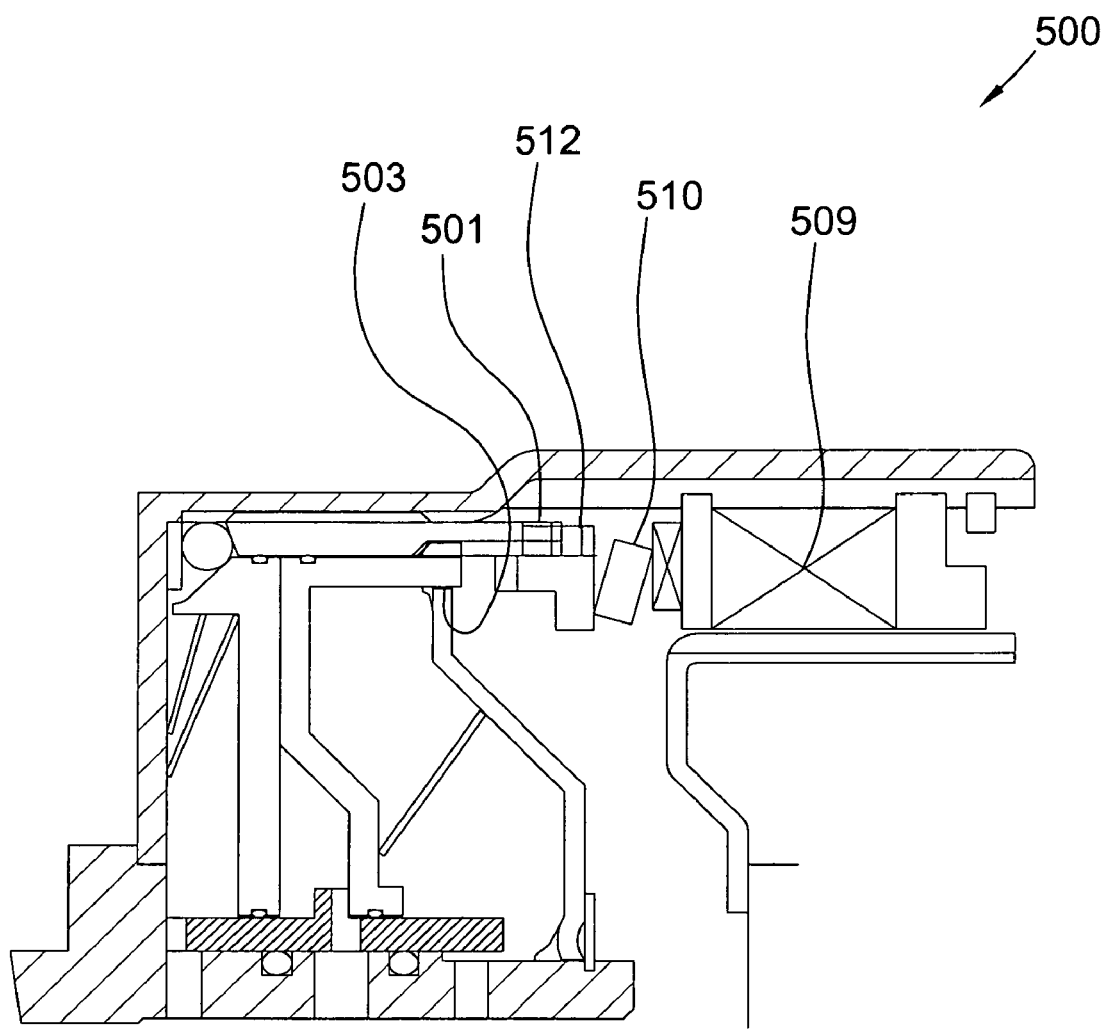
FIG. 17 is a cross sectional view of the transmission clutch shown in FIG. 16 in a low pressure open condition at the end of a release cycle.

FIG. 17 is a cross sectional view of transmission clutch 500 in a low pressure open condition at the end of a release cycle.

Figure 18:
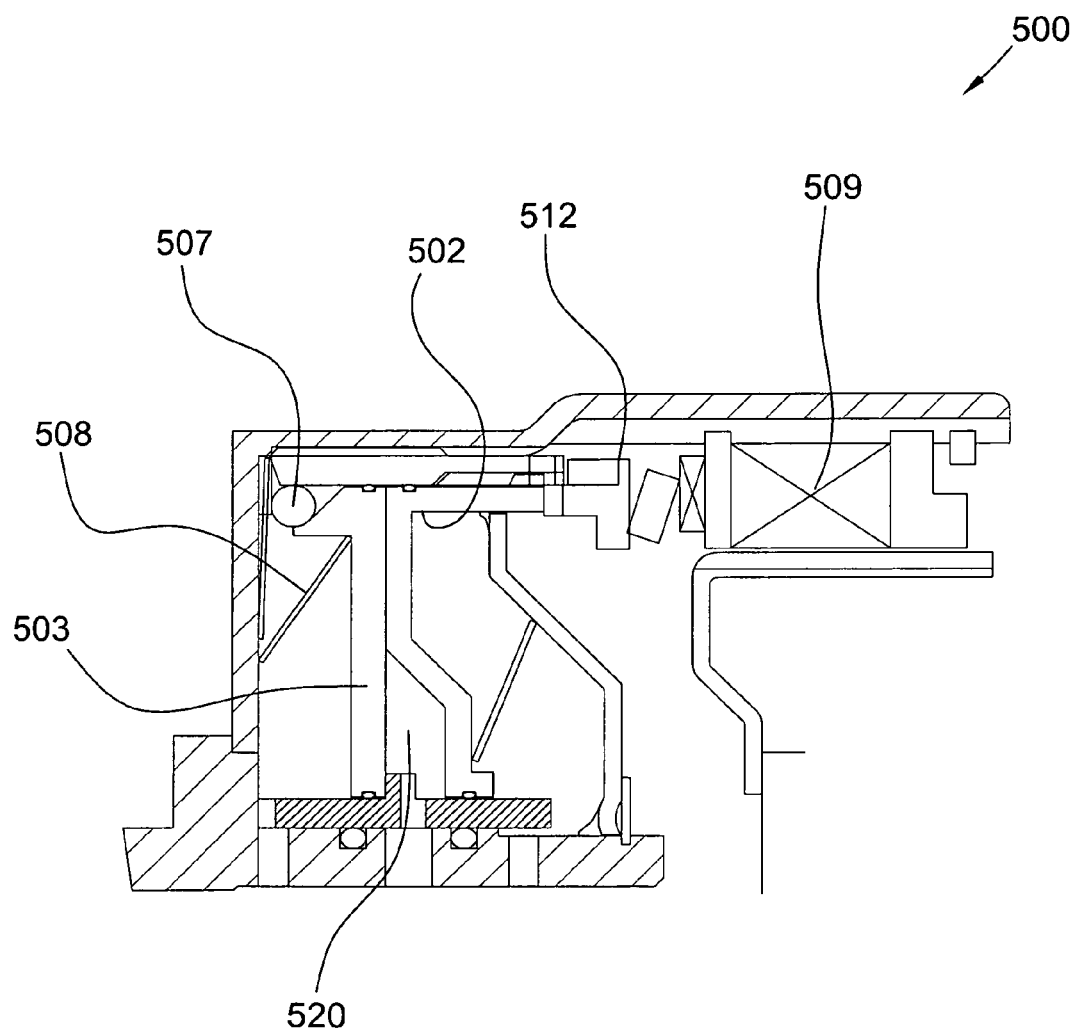
FIG. 18 is a cross sectional view of a present invention transmission clutch in a fail-safe open condition.

FIG. 18 is a cross-sectional view of transmission clutch 500 in a fail safe open condition. The following should be viewed in light of FIGS. 13 through 17. Transmission clutch 500 includes pistons 502 and 503. Piston 503 is displaceable, for example, by controlling pressure in fluid chamber 520, to operate clutch pack 509. Chamber 520 is at least partially formed by pistons 502 and 503. Piston 502 is displaceable by fluid pressure in chamber 520. Locking means 507 is fixable by piston 502, as further described infra, to hold the clutch pack in a closed position. In a preferred embodiment, means 507 is at least one ball. The ball is axially and radially displaceable. As further described infra, if the fluid pressure in chamber 520 is lost, whether intentionally or due to malfunction, piston 502 is displaceable to release the locking means and to enable the clutch to open.

Clutch pack 509 transmits torque in transmission 522. The clutch pack can be any clutch pack known in the art. Clutch pack 509 receives clamping load from wear compensation spring 510. Wear compensation spring 510 is employed to maintain axial position of the transmission clutch components as friction material (not shown) in clutch pack 509 wears during the life of the vehicle.

Spring 510 reacts against primary piston 503 via cam follower 512, which provides clamping force when clutch apply is desired. Pressurized fluid is applied to piston 503 through pressure port 504. Pressure also is applied to piston 502 through pressure port 504. Outer diameter of piston 503 is sealed to cam ring 501, and inner diameter of piston 503 is sealed to reaction ring 524. Inner diameter of reaction ring 524 is sealed to the housing.

Outer diameter of piston 502 is sealed to cam ring 501, and inner diameter of piston 502 is sealed to reaction ring 524. Piston 502 is urged towards piston 503 by return spring 508. Ball 507 is received in space 526 between backing ring 511 and the cam ring. Spring 527 urges piston 503 toward piston 502.

The operation of the clutch assembly will now be described. To engage clutch 500, oil at high pressure, for example, 10 bar, is introduced into chamber 520 through port 504 as shown in FIG. 14. This forces piston 503 to move to the right pushing follower 512 and engaging the clutch pack 509. Once follower 512 is pushed past a certain point, follower 512 rotationally indexes. Thrust bearing 513 reduces friction between clutch pack 509 and wear compensating spring 510.

In FIG. 15, the high pressure at port 504 is replaced by lower pressure, for example, 2 bar, to seat the follower 512 at its current index position. In this state the follower 512 is seated on ring cam 501. Spring 510 urges follower 512 to the left, but ring cam 501 and ball/roller lock 507 react on backing ring 511 and hold piston 502. Piston 502 is held in position by the lower pressure of the oil supply in chamber 520. The high pressure supply at port 504 can be modulated to a lower pressure value or replaced by a lower oil pressure supply. The pressure in chamber 520 is kept high enough to sustain the position of the hold piston 502.

As shown in FIG. 16, to disengage clutch pack 509, high pressure oil is reintroduced through port 504. This moves primary piston 503 to the right, pushing and indexing follower 512 at the same time. As shown in FIG. 17, the high pressure supply is then removed, causing primary piston 503 and follower 512 to move to the left. Follower 512 follows a groove in ring cam 501 while being pushed by the back force from spring 510. The groove is long enough to let follower 512 move far enough to free clutch pack 509.

Clutch 509 is automatically disengaged if oil pressure in chamber 520 is lost. Hold piston 502 is pushed to the right by hold piston return spring 508 freeing ball/roller lock 507. Ring cam 501 is immediately freed, allowing follower 512 to move to the left to free clutch pack 509. This fail safe operation is shown in FIG. 18.

Figure 19:
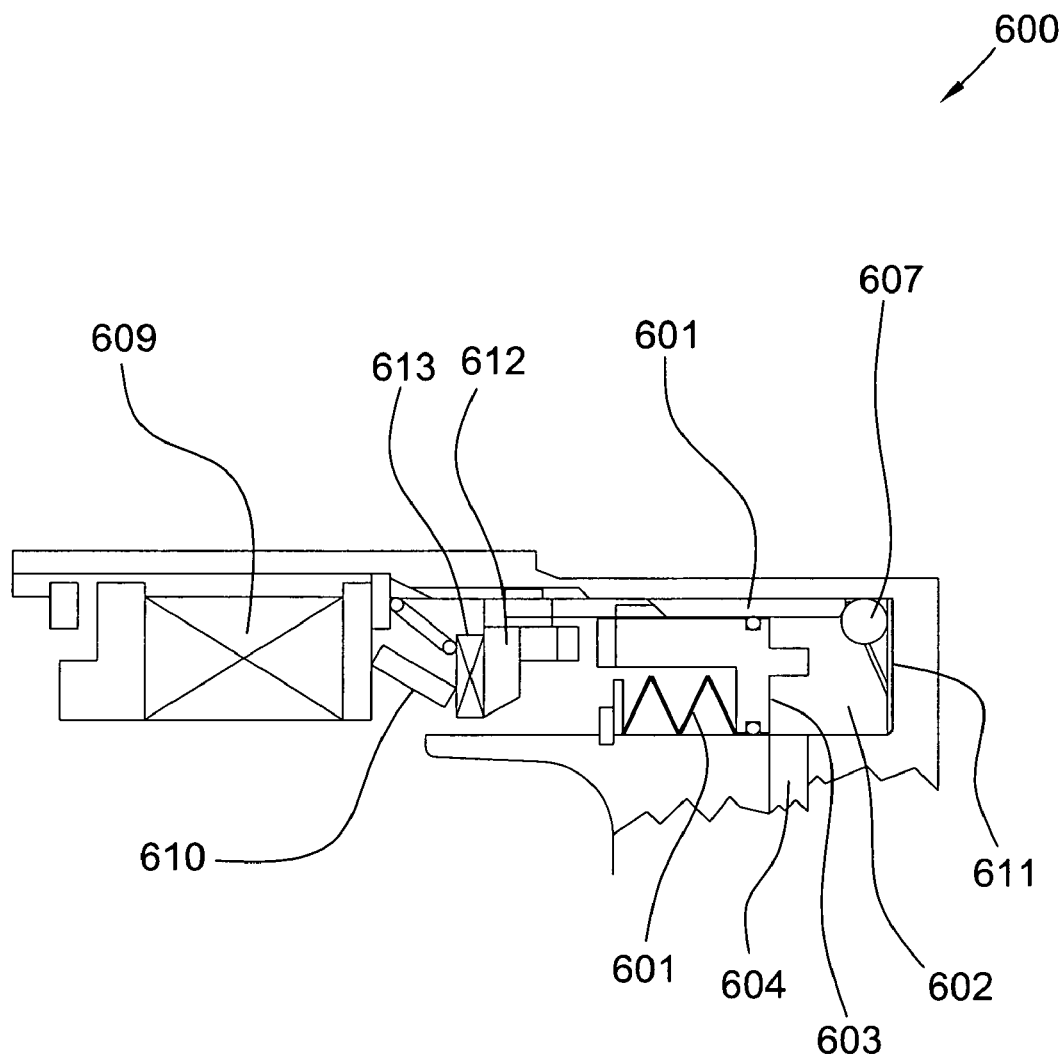
FIG. 19 is a cross sectional view of a present invention transmission brake; and, FIG. 20 is a cross sectional view of a present invention transmission clutch illustrating a reset operation.

FIG. 19 is a cross sectional view of transmission brake 600. The design of clutch 500 may also be used in a transmission brake, as shown in FIG. 19. In general, brake 600 has the same components as clutch 500 and the discussion regarding clutch 500 is applicable to brake 600. Components "5xx" in FIGS. 13-18 are referenced as "6xx" in FIG. 19 and have similar functions in both figures. For example, piston 602 in FIG. 19 has a similar function to piston 502 in FIG. 13. However, clutch pack 609 is grounded to case 614.

Figure 20:
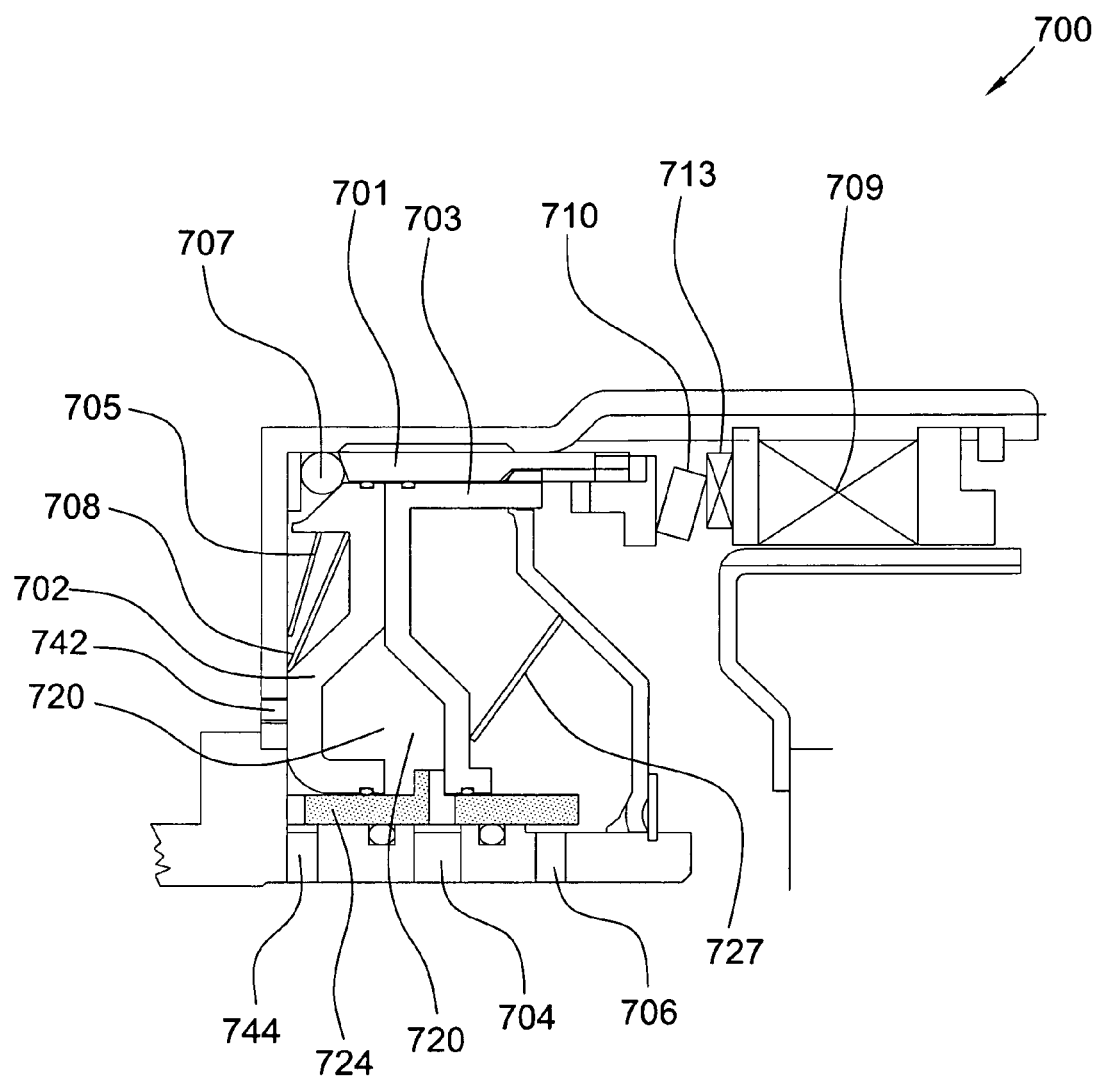

FIG. 20 is a cross-sectional view of present invention transmission clutch 700 illustrating a reset operation. In general, the discussion regarding clutch 500 in the descriptions of FIG. 13 through 18 is applicable to clutch 700 and clutch 700 has the same components as clutch 500. Components "5xx" in FIGS. 13-18 are referenced as "7xx" in FIG. 20 and have similar functions in both figures. For example, piston 702 in FIG. 20 has a similar function to piston 502 in FIG. 13. Clutch 500 requires a reset sequence after a pressure loss event. During the reset sequence, it is necessary to determine the state of hold piston 502, i.e., whether it is in a reset state (as shown in FIG. 13) or in a failed state (as shown in FIG. 18). Clutch 700 is an adaptation of clutch 500 that enables such a determination. Specifically, piston 702 is a modified version of piston 502 and bleed hole 742 has been added. Back pressure is measured after applying a low value pressure to the reset feedback port 701. If a back pressure exists, the hold piston 702 is in a reset state allowing oil introduced via reset feedback port 744 to bleed out through bleed hole 703 without developing a back pressure.

The present invention also includes a method of operating a clutch. Although the method is depicted as a sequence for clarity, no order should be inferred from the sequence unless explicitly stated. A first step applies fluid pressure to a first fluid chamber partially formed by first and second pistons; a second step axially displaces the first piston to engage and displace a locking means; a third step fixes the locking means with the first piston; and a fourth step holds, with the locking means, the clutch pack in a closed position. In a preferred embodiment, one step applies fluid pressure to a second fluid chamber partially formed by the second piston and another step axially displaces the second piston to close the clutch pack. In one embodiment, a further step reduces or removes the fluid pressure in the second chamber and a still further step maintains, with the locking means, the closed position. In another preferred embodiment, a fifth step axially displaces the second piston to close a clutch pack.

In one embodiment, axially displacing the second piston to close the clutch pack includes engaging a cam follower to close the clutch pack and another step axially aligns, with the first piston, the locking means with a cam ring to axially fix the cam follower. In another embodiment, one step applies fluid pressure to a second fluid chamber partially formed by the second piston; and another step axially displaces the second piston to close a clutch pack. In a further preferred embodiment, holding, with the locking means, the clutch pack in a closed position includes axially fixing the second piston with the locking means.

In a further embodiment, one step controls respective fluid pressures in the first chamber and in second and third chambers to control displacement of the first piston, the second fluid chamber partially formed by the second piston and separate from the first fluid chamber and the third fluid chamber separate from the first and second fluid chambers and partially formed by the first piston; and another step displaces the first piston to operate a control valve to increase fluid pressure in the first chamber with respect to fluid pressure in the third chamber. Then, axially displacing the first piston includes axially displacing the first piston in response to a fluid pressure difference between the first and third chambers. A further step displaces the first piston to operate the control valve to substantially equilibrate respective fluid pressures in the first and third chambers; and yet another step disengages, in response to the equilibrated respective fluid pressure, the first piston from the locking means to enable opening of the clutch pack.

In yet another embodiment, one step controls respective fluid pressures in the first chamber and in second and third chambers to control displacement of the first piston, the second fluid chamber partially formed by the second piston and separate from the first fluid chamber and the third fluid chamber separate from the first and second fluid chambers and partially formed by the second piston; and another step displaces the first piston to operate a control valve to place the first and third fluid chambers in fluid isolation. Then, axially displacing the first piston includes axially displacing the second piston in response isolating the first and third chambers. A further step displaces the first piston to operate the control valve to place the first and third chambers in fluid communication; and yet another step disengages, in response to the fluid communication, the first piston from the locking means to enable opening of the clutch pack.

Thus, it is seen that the objects of the invention are efficiently obtained, although changes and modifications to the invention should be readily apparent to those having ordinary skill in the art, without departing from the spirit or scope of the invention as claimed. Although the invention is described by reference to a specific preferred embodiment, it is clear that variations can be made without departing from the scope or spirit of the invention as claimed.

We claim:

1. A clutch comprising:
   a first piston displaceable to operate a clutch pack;
   a second piston;
   a first fluid chamber at least partially formed by the first and second pistons, wherein the second piston is displaceable by fluid pressure in the first fluid chamber;
   a second chamber, separate from the first chamber, partially formed by the first piston; and,
   a locking means fixable by the second piston to hold the clutch pack in a closed position, wherein the first piston is displaceable in response to fluid pressure in the second chamber.

2. The clutch of claim 1, wherein the locking means comprises at least one radially displaceable ball.

3. The clutch of claim 1, wherein, in response to a loss of fluid pressure in the first chamber, the second piston is displaceable to enable displacement of the locking means to open the clutch pack.

4. The clutch of claim 1, further comprising:
   a cam follower; and,
   a cam ring engaged with the cam follower, wherein by pressurizing the first fluid chamber:
      the first piston is displaceable to engage the cam follower to close the clutch pack;
      the locking means is axially aligned with the cam ring to axially fix the cam follower; and,
      the second piston is engaged with the locking means to fix the locking means.

5. The clutch of claim 1, further comprising:
   a second fluid chamber partially formed by the first piston and separate from the first fluid chamber;
   a third fluid chamber separate from the first and second fluid chambers and partially formed by the second piston, wherein displacement of the second piston is controllable by respective fluid pressures in the first, second, and third fluid chambers; and,
   a control valve operable by displacement of the second piston to control fluid pressure in the third fluid chamber, wherein the second piston is displaceable to fix the locking means when the first chamber is pressurized and the third chamber is vented and wherein the locking means is displaceable to enable axial displacement of the first piston when the respective fluid pressures in the first and third chambers are substantially equal.

6. The clutch of claim 1, further comprising:
   a second fluid chamber partially formed by the first piston and separate from the first fluid chamber;
   a third fluid chamber separate from the first and second fluid chambers and partially formed by the second piston, wherein displacement of the second piston is controllable by respective fluid pressures in the first, second, and third fluid chambers; and,
   a control valve operable by displacement of the second piston to control fluid communication between the first and third fluid chambers, wherein the second piston is displaceable to fix the locking means when the first and third fluid chambers are in fluid isolation and wherein the locking means is displaceable to enable axial displacement of the first piston when the first and second chambers are in fluid communication.

7. The clutch of claim 1, further comprising a wear compensation spring engaged with the first piston and the clutch pack.

8. The clutch of claim 1 wherein the clutch pack remains closed after a loss or reduction of fluid pressure in the second chamber while the first chamber remains pressurized.

9. The clutch of claim 1, wherein the first piston is axially fixable by the locking means.

10. A clutch comprising:
    a first piston;
    a first fluid chamber at least partially formed by the first piston, wherein the first piston is displaceable by pressure in the first fluid chamber to operate a clutch pack;
    a second piston;
    a second fluid chamber at least partially formed by the first and second pistons and separate from the first chamber, wherein the second piston is displaceable by fluid pressure in the second fluid chamber;
    at least one ball displaceable by the second piston, wherein the at least one ball is displaceable to axially fix the first piston to close the clutch pack when the second fluid chamber is pressurized, wherein, in response to a loss of fluid pressure in the second chamber, the second piston is displaceable to enable displacement of the at least one ball to open the clutch pack, and wherein the at least one ball remains axially fixed when the pressure in the first fluid chamber is removed and the second chamber remains pressurized.

11. A method of operating a clutch comprising the steps of:
    applying fluid pressure to a first fluid chamber partially formed by first and second pistons;
    axially displacing the first piston to engage and displace a locking means;
    fixing the locking means using the first piston;
    axially displacing the second piston to close the clutch pack; and,
    holding, with the locking means, the clutch pack in a closed position.

12. The method of claim 11 further comprising the steps of:
    applying fluid pressure to a second fluid chamber partially formed by the second piston; and,
    axially displacing the second piston to close the clutch pack.

13. The method of claim 12 further comprising the steps of:
    reducing or removing the fluid pressure in the second chamber while maintaining fluid pressure in the first chamber; and,
    maintaining, with the locking means, the closed position.

14. The method of claim 12 wherein axially displacing the second piston to close the clutch pack includes engaging a cam follower to close the clutch pack, the method further comprising the step of axially aligning, with the first piston, the locking means with a cam ring to axially fix the cam follower.

15. The method of claim 11 further comprising:
    controlling respective fluid pressures in the first chamber and in second and third chambers to control displacement of the first piston, the second fluid chamber partially formed by the second piston and separate from the first fluid chamber and the third fluid chamber separate from the first and second fluid chambers and partially formed by the first piston; and,
    displacing the first piston to operate a control valve to increase fluid pressure in the first chamber with respect to fluid pressure in the third chamber and wherein axially displacing the first piston includes axially displacing the first piston in response to a fluid pressure difference between the first and third chambers.

16. The method of claim 15 further comprising the steps of:
    displacing the first piston to operate the control valve to substantially equilibrate respective fluid pressures in the first and third chambers; and, disengaging, in response to the equilibrated respective fluid pressure, the first piston from the locking means to enable opening of the clutch pack.

17. The method of claim 11 further comprising:
controlling respective fluid pressures in the first chamber and in second and third chambers to control displacement of the first piston, the second fluid chamber partially formed by the second piston and separate from the first fluid chamber and the third fluid chamber separate from the first and second fluid chambers and partially formed by the second piston; and,
displacing the first piston to operate a control valve to place the first and third fluid chambers in fluid isolation and wherein axially displacing the first piston includes axially displacing the second piston in response isolating the first and third chambers.

18. The method of claim 17 further comprising the steps of:
displacing the first piston to operate the control valve to place the first and third chambers in fluid communication; and,
disengaging, in response to the fluid communication, the first piston from the locking means to enable opening of the clutch pack.

19. A method of operating a clutch comprising the steps of:
applying a first fluid pressure to a first fluid chamber partially formed by a first piston;
axially displacing the first piston to close a clutch pack;
applying a second fluid pressure to a second fluid chamber, separate from the first fluid chamber, partially formed by the first piston and a second piston;
axially displacing the second piston to engage and displace at least one ball;
fixing the at least one ball using the second piston;
axially fixing, with the at least one ball, the first piston to hold the clutch pack in a closed position;
removing the pressure in the first fluid chamber while maintaining pressure in the second fluid chamber; and,
maintaining, using the second piston, an engagement of the at least one ball and the first piston to hold the clutch pack in the closed position.

\* \* \* \* \*